United States Patent [19]

Ichiryu et al.

[11] Patent Number: 4,813,447

[45] Date of Patent: Mar. 21, 1989

[54] FLOW CONTROL VALVE APPARATUS

[75] Inventors: Ken Ichiryu, Shimoinayoshi; Takashi Kanai, Kashiwa; Masami Ochiai, Chiyoda; Yuusaku Nozawa, Minori; Hideyo Kato, Shimoinayoshi, all of Japan

[73] Assignee: Hitachi Construction Machinery Co., Ltd., Tokyo, Japan

[21] Appl. No.: 193,690

[22] Filed: May 13, 1988

[30] Foreign Application Priority Data

| May 14, 1987 | [JP] | Japan | 62-115742 |
| May 14, 1987 | [JP] | Japan | 62-115744 |
| Jan. 26, 1988 | [JP] | Japan | 63-13672 |

[51] Int. Cl.$^4$ ............................................. G05D 7/00
[52] U.S. Cl. .................................. 137/486; 137/487.5
[58] Field of Search .............................. 137/486, 487.5

[56] References Cited

U.S. PATENT DOCUMENTS

| 2,596,691 | 5/1952 | Jackson et al. | 137/486 |
| 2,696,083 | 7/1954 | Eddy | 137/486 X |
| 2,803,261 | 8/1957 | Carlson | 137/486 X |
| 3,171,432 | 3/1965 | Bard | 137/486 X |

Primary Examiner—Alan Cohan
Attorney, Agent, or Firm—Oblon, Fisher, Spivak, McClelland & Maier

[57] ABSTRACT

A flow control valve apparatus includes a housing including a main fluid passage having an inlet port and an outlet port; a main valve disposed between the inlet port and the outlet port for allowing or shutting off communication between the inlet port and the outlet port; a backpressure chamber formed between an inner wall of the housing and a rear portion of a valve member of the main valve, the backpressure chamber communicating with the inlet port through an orifice; an auxiliary passage for placing the backpressure chamber in communication with the outlet port; and a pivot valve for actuating the main valve by controlling the opening and closing of the auxiliary passage and varying the fluid pressure in the backpressure chamber. A differential pressure generating means is disposed in the main fluid passage for generating differential pressures that correspond to the flow rate in the main fluid passage. The differential generating means includes a displacement member disposed for movement in the direction in which a fluid flows in the main fluid passage and spring means for urging the displacement member in the direction opposite to the direction in which the fluid flows, and the displacement member cooperates with a wall surface of the main fluid passage to define a fluid passage having an opening area which increases in accordance with an increase in the stroke of travel of the displacement member.

15 Claims, 14 Drawing Sheets

FLOW CONTROL VALVE APPARATUS

BACKGROUND OF THE INVENTION

1. Field of the Invention

The present invention relates generally to flow control valve apparatus and, more particularly, to a flow control valve apparatus provided with a pressure compensation function suitable for use in controlling the operation of a hydraulic actuator incorporated in a hydraulic machine such as a hydraulic shovel.

2. Description of the Related Art

A conventional type of flow control valve apparatus provided with a pressure compensation function, as disclosed in PCT publication No. WO83/01095, includes a housing having a main fluid passage provided with an inlet port and an outlet port, a main valve disposed between the inlet port and the outlet port for allowing or shutting off communication between the inlet port and the outlet port, a backpressure chamber formed between the housing and the valve member of the main valve for causing a fluid pressure to act upon the valve member of the main valve in the valve-closing direction, an auxiliary passage for providing communication between the backpressure chamber and the outlet port, and a pilot valve for selectively opening and closing the auxiliary passage to vary the fluid pressure in the backpressure chamber thereby operating the main valve. The main valve is formed as a seat valve, and the valve member of the main valve is provided with a plurality of slits which constitute an adjustable orifice by the cooperation with a cylindrical sleeve fixed to the housing, the backpressure chamber communicating with the outlet port through the slits. The auxiliary passage is formed in the housing, and a valve piston serving as a pressure compensation valve is disposed between the pilot valve in the auxiliary passage and the backpressure chamber. The pressure at the inlet side of the pilot valve or an equivalent pressure is conducted to one end of the valve piston through a first communication passage, while pressure at the outlet side of the pilot valve or an equivalent pressure is conducted to the other end of the valve piston through a second communication passage.

When an operating lever of the pilot valve is operated to open the pilot valve, the fluid in the inlet port flows through the adjustable-orifice type slits, the backpressure chamber and the auxiliary passage into the outlet port, to form a pilot flow. At this time, since the fluid flowing from the inlet port to the outlet port is restricted by the adjustable orifice, a pressure difference occurs between the inlet port and the backpressure chamber, and the fluid pressure in the backpressure chamber becomes lower than the fluid pressure in the inlet port. Thus, the valve member of the main valve is opened and the fluid in the inlet port flows into the outlet port through the main valve. The pilot flow rate at this time is determined by the set opening of the pilot valve, and the fluid pressure in the backpressure chamber is determined by the flow rate of fluid flowing through the slits, that is, the pilot flow rate. Therefore, the opening of the valve member of the main valve is finally determined by the set opening of the pilot valve, so that the flow rate proportional to the operation input of the pilot valve can be obtained in the main fluid passage.

In this state, when, for example, the fluid pressure in the inlet port rises and the differential pressure between the inlet port and the outlet port increases, the flow rate of fluid flowing through the main valve ends to increase and, at the same time, the pilot flow rate tends to increase. As a result, the differential pressure between the inlet pressure and the outlet pressure of the pilot valve increases. Since the differential pressure is conducted through the first and second communication passages to the opposite ends of the valve piston serving as a pressure compensation valve, the valve piston is displaced in correspondence with the increase in the differential pressure to restrict the pilot flow rate. Thus, the pilot flow rate decreases and the orifice effect of the slits is reduced. Therefore, the pressure in the backpressure chamber increases to cause the opening of the main valve to decrease. In consequence, the flow rate of fluid flowing in the main fluid passage is maintained at a predetermined relationship with the pressure increase in the inlet port, for example, kept constant to thereby provide pressure compensation.

However, such a conventional type of flow control valve apparatus encounters various problems such as complexity in structure, an increased number of steps of production and assembly, and an increase in production cost in that a high-precision pressure compensation valve including a valve piston is needed; in that a plurality of slits having high dimensional precision is needed to constitute an adjustable orifice in the valve member of the main valve; and in that it is necessary to provide a complicated fluid passage of passages including the first and second communication passages and the auxiliary passage in the housing. In addition, since pressure compensation is effected through the pressure compensation valve for controlling the pilot flow rate, it has been impossible to avoid the problem that satisfactory follow-up performance can be achieved with respect to variations in pressure.

SUMMARY OF THE INVENTION

It is therefore an object of the present invention to provide a flow control valve apparatus having a pressure compensation function featuring a relatively simplified structure, a reduced number of steps of production and assembly, and a reduced production cost.

It is another object of the present invention to provide a flow control valve apparatus with a pressure compensation function having good follow-up performance with respect to pressure variations.

To achieve the above and other objects, in accordance with the present invention, there is provided a flow control valve apparatus comprising: a housing including a main fluid passage having an inlet port and an outlet port; a main valve disposed between inlet port and the outlet port for allowing or shutting off communication between the inlet port and the outlet port; a backpressure chamber formed between an inner wall of the housing and a rear portion of a valve member of the main valve, the backpressure chamber communicating with the inlet port through an orifice; an auxiliary passage for placing the backpressure chamber in communication with the outlet port; and a pilot valve for actuating the main valve by controlling the opening and closing of the auxiliary passage and varying the fluid pressure in the backpressure chamber, characterized by a differential pressure generating means disposed in the main fluid passage for generating differential pressures that correspond to the flow rate in the main fluid passage, the differential generating means including a displacement member disposed for movement in the direction of fluid flow in the main fluid passage and spring means for urging the displacement member in the direction opposite to the direction of fluid flow, the displacement member cooperating with a wall surface of the main fluid passage to define a fluid passage having an opening area which increases with an increase in the stroke of travel of the displacement member; and control means for controlling the operating force of the pilot valve in correspondence with differential pressures generated by the differential pressure generating means.

In this arrangement, when an operating force corresponding to an operation input command is imparted to the pilot valve, the pilot valve is opened and a pilot flow is formed along which the fluid in the inlet port flows through an orifice, the backpressure chamber and the auxiliary passage into the outlet port. At this time, since the fluid flowing from the inlet port to the outlet port is restricted by the orifice, a pressure difference occurs between the inlet port and the backpressure chamber, and the fluid pressure in the backpressure chamber becomes lower than the fluid pressure in the inlet port. Thus, the main valve is opened owing to the pressure drop and the fluid in the inlet port flows into the outlet port through the main valve. At this time, the differential pressure generating means disposed in the main fluid passage senses the flow rate as a differential pressure, and the control means controls the operating force of the pilot valve in accordance with the differential pressure. Thus, the opening of the pilot valve is adjusted to vary the pressure in the backpressure chamber so that the flow rate corresponding to the operating force of the pilot valve can be obtained in the main fluid passage.

In this state, when, for example, the fluid pressure in the inlet port rises and the differential pressure between the inlet port and the outlet port increases, the flow passing through the main valve transiently increases. However, the differential pressure generating means controls the operating force of the pilot valve in correspondence with the increase in the flow rate to reduce the opening of the pilot valve. Accordingly, the pressure in the backpressure chamber increases to cause the opening of the valve member of the main valve to decrease so that the flow rate of fluid flowing through the main fluid passage decreases. Thus, the flow rate of fluid flowing in the main fluid passage is maintained in a predetermined relationship with increases in the pressure in the inlet port to thereby provide a pressure compensation function.

In the flow control valve apparatus of the present invention which operates as described above, since the differential pressure generating means and the control means can be simplified in structure, the overall structure is simplified and, therefore, the number of steps of production and assembly can be reduced. In addition, an increase in the flow rate is sensed directly by the differential pressure generating means disposed in the main fluid passage in place of a pressure compensation valve for controlling the pilot flow rate. Accordingly, it is possible to achieve a differential-pressure compensation which excels in follow-up performance.

Preferably, tee shape of the wall surface of the main fluid passage is formed so that the aforesaid opening area assumes a root function or a function approximate to the root function with respect to the stroke of travel of the displacement member. Since the shape of the wall surface of the main fluid passage is defined in this manner, it is possible to provide flow characteristics which are approximately linearly proportional to the operating force of the pilot valve. Even if the differential pressure between the inlet port and the outlet port increases, it is possible to achieve a pressure compensation function which ensures an approximately constant flow rate that corresponds to the operating force of the pilot valve.

The aforesaid control means may include spring means for urging the displacement member of the differential pressure generating means and the valve member of the pilot valve toward each other. The spring means transfers the differential pressure generated in the differential pressure generating means to the valve member of the pilot valve as a spring force corresponding to the displacement of the displacement member to mechanically control the operating force of the pilot valve. In this arrangement, flow characteristics can be adjusted by adjustment of the spring force of the spring means or replacement of the spring means.

The spring means may be constituted by a tension spring disposed between the displacement member of the differential pressure generating means and the valve member of the pilot valve. The control means may further include a rod member integral with the displacement member of the differential pressure generating means and extending through the valve member of the pilot valve. The spring means may also be constituted by a compression spring disposed between a valve spool of the pilot valve and the end of the rod member opposite to the displacement member. In this case, since the compression spring is located at the end of the pilot valve opposite to the displacement member, adjustment of the spring force of the compression spring and replacement of the compression spring can be facilitated.

The aforesaid control means may be comprised of a pilot valve spool integral with a valve member of the pilot valve and passage means for conducting pressure upstream of the displacement member of the differential pressure generating means to one end of the pilot valve spool and for conducting pressure downstream of the displacement member to the other end of the pilot valve spool. In this example, the differential pressure generated by the differential pressure generating means is made to act upon the opposite ends of the pilot valve spool through the passage means to hydraulically control the operating force of the pilot valve. In this state, flow characteristics can be adjusted by adjusting the pressure receiving area of the end of the pilot valve spool. In this example, a pressing rod may be additionally disposed which has one end projecting into the upstream side of the displacement member of the differential pressure generating means and the other end projecting into the downstream side of the displacement member, and the pressing rod may be disposed for engagement with the valve member of the pilot valve. When the main valve opens, the pressing rod is pressed into contact with the valve member of the pilot valve to hold it in the closed position. Thus, it is possible to prevent the danger that the pressure downstream of the displacement member may vary and the resultant pressure may act upon the end of the pilot valve spool to cause the valve to open.

The aforesaid control means may be constituted of sensing means for electrically sensing the displacement of the displacement member of the differential pressure generating means and controlling means for controlling the operating force of the pilot valve in response to electrical signals provided by the sensing means. More specifically, the differential pressure generated by the differential pressure generating means is detected as electrical signals corresponding to the displacement of the displacement member to electrically control the operating force of the pilot valve.

The aforesaid displacement member of the differential pressure generating means may also serve as a check valve. With this arrangement, it is possible to prevent fluid from leaking from the inlet port into the outlet port even if the fluid pressure in the outlet port becomes higher than the fluid pressure in the inlet port. Therefore, it is possible to provide a flow control valve apparatus suitable for incorporation in a meter-in hydraulic control system.

The aforesaid auxiliary passage may preferably include a through hole which is coaxially formed in the valve member of the main valve, and the pilot valve may be constructed to have a movable valve seat integral with the valve member of the main valve and formed at one end of the auxiliary passage. The construction of the auxiliary passage can be simplified by incorporating the auxiliary passage in the valve member of the main valve. In addition, since the valve member of the main valve is provided with such a movable valve seat, at the time of transient operation, adjustment of the opening of the main valve can be performed directly by controlling the operating force of the pilot valve. Therefore, the period required for the valve mechanism to reach its steady state is shortened and good response is achieved.

Alternatively, the flow control valve apparatus may further comprise a fixed guide of the valve member of the main valve formed on a wall portion of the housing that forms the backpressure chamber and projecting toward the valve member of the main valve, and the auxiliary passage may include a through hole coaxially formed in the valve member and the fixed guide. The pilot valve may have a fixed valve seat integral with the housing and formed on the fixed guide at one end of the through hole thereof. Since the valve seat of the pilot valve is provided at a fixed portion, the axes of the pilot valve member and the valve seat need only to be aligned and the production is facilitated.

The main valve may preferably be a seat valve. With this arrangement, it is possible to provide a flow control valve apparatus which is suitable for an increased-pressure hydraulic control system because of its extremely low level of inner leakage.

The aforesaid auxiliary passage may preferably include a through hole which is formed in the valve member of the main valve member along the axis thereof, and the pilot valve and the displacement member of the differential pressure generating means may be coaxially disposed with the valve member interposed between the pilot valve and the displacement member. The rational arrangement of the respective members is achieved and the size of the flow control valve apparatus can be reduced. For example, the control means may include a tension spring disposed between the displacement member of the differential pressure generating means and the valve member of the pilot valve for urging the displacement member and the valve member of the pilot valve toward each other with the valve member of the main valve interposed therebetween, and the tension spring may be disposed in the through hole formed in the valve member of the main valve. In addition, the control means may include a rod member integral with the displacement member of the differential pressure generating means and a compression spring disposed between the end of the rod member opposite to the displacement member and a valve spool of the pilot valve, and the compression spring for urging the displacement member and the pilot valve member toward each other with the valve member of the main valve member interposed therebetween. The rod member may be disposed in a through hole formed in the valve member of the main valve and a through hole formed in the valve member of the pilot valve.

The above and other objects, features and advantages of the present invention will become apparent from the following description of the preferred embodiments thereof, taken in conjunction with the accompanying drawings.

DESCRIPTION OF THE PREFERRED EMBODIMENTS

A flow control valve apparatus according to a first embodiment of the present invention will be described below with reference to FIG. 1.

Figure 1:
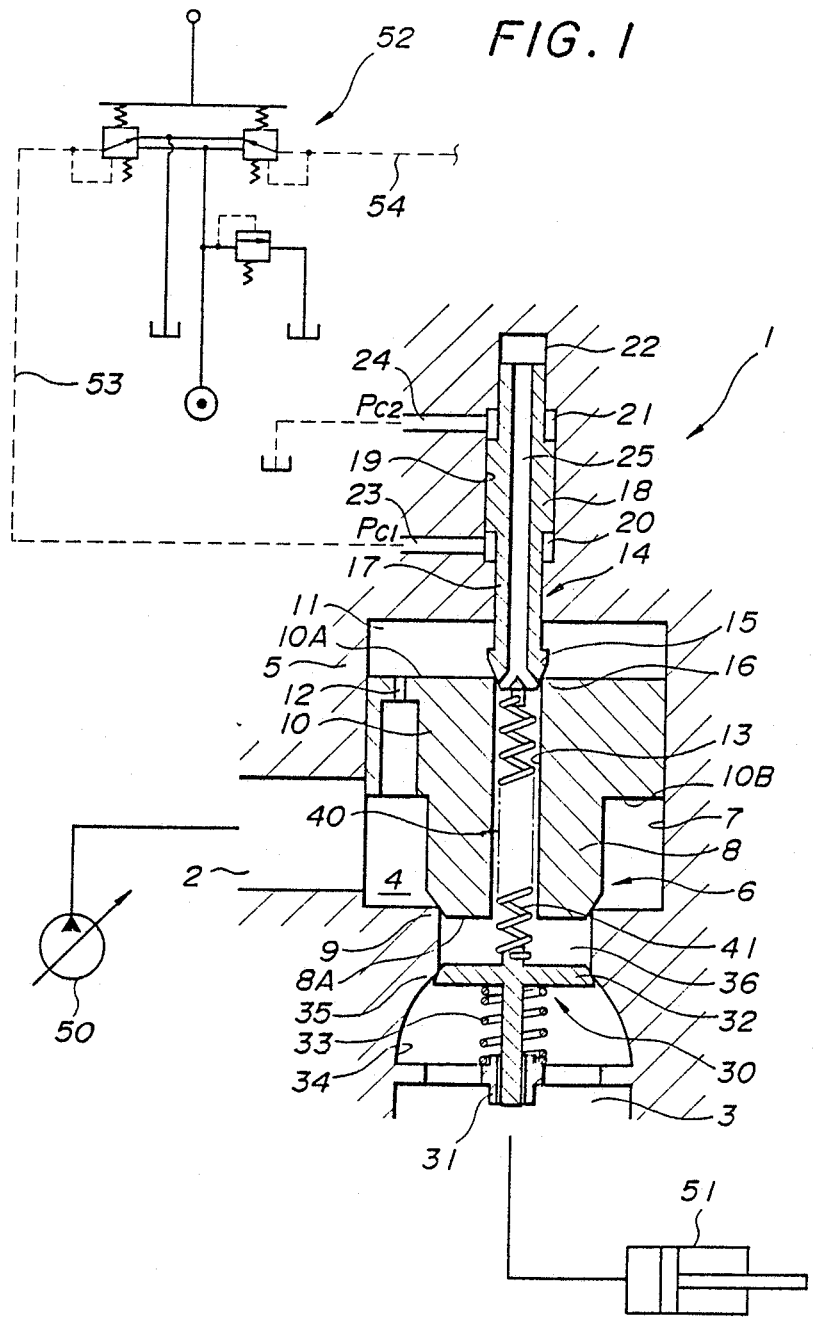
FIG. 1 is a cross-sectional view of a flow control valve apparatus according to a first embodiment of the present invention.

In FIG. 1, the flow control valve apparatus according to the first embodiment is indicated generally by numeral 1. The flow control valve apparatus 1 includes a housing 5 having a main fluid passage 4 provided with an inlet port 2 and an outlet port 3. A main valve 6 which allows communication between the inlet port 2 and the outlet port 3 or shuts off that communication is disposed at an intermediate location between the inlet port 5 and the outlet port 3 in the housing 5. The main valve 6 is formed as a seat valve constituted by a valve member 8 accommodated for axial movement in a valve chamber 7 formed in the housing 5 and a valve seat 9 integral with the housing 5, the valve member 8 being engageable with the valve seat 9. The valve member 8 of the main valve 6 (hereinafter referred to as "main valve member 8") has a rear portion 10 on the side opposite to the valve seat 9, and the rear portion 10 has an enlarged diameter to allow the main valve member 8 to slide axially on the inner wall of the valve chamber 7 in a sealed manner. In the housing 5, a backpressure chamber 11 is formed as a part of the valve chamber 7 between the inner wall of the housing 5 and the main valve member 8. The backpressure chamber 11 communicates with the inlet port 2 through an orifice 12 provided in the rear portion 10 of the main valve member 8.

The main valve member 8 has a through hole 13 which is formed coaxially therewith, and the through hole 13 constitutes an auxiliary passage which provide communication between the backpressure chamber 11 and the outlet port 3. The opening and closing of the auxiliary passage 13 is controlled by a pilot valve 14.

The pilot valve 14 is constituted by a poppet-type valve member 15 disposed coaxially with the main valve member 8 and a movable valve seat 16 with which the valve member 15 engages and which is integral with the main valve member 8. The pilot valve 14 has an operating portion provided with a valve spool 17 integral with the valve member 15 of the pilot valve 14 (hereinafter referred to as "pilot valve member 15"), and the valve spool 17 has a piston portion 18 with an enlarged diameter. The valve spool 17 and the piston portion 18 are accommodated in a valve chamber 19 formed in the housing 5 in such a manner as to slide axially on the inner wall of the valve chamber 19 in a sealed manner. A first pressure chamber 20 and a second pressure chamber 21 are formed between the inner wall of the valve chamber 19 and the opposite annular end surfaces of the piston portion 18, and a pressure balancing chamber 22 is formed between the end surface of the valve spool 17 opposite to the valve member 15 and the inner wall of the valve chamber 19. The first and second pressure chambers 20 and 21 respectively communicate with control passages 23 and 24, and pilot pressures Pc1 and Pc2 are respectively introduced through the control passages 23 and 24 in accordance with an operation input command. The valve spool 17 has an axial through passage 25 which communicates with the pressure balancing chamber 22. With this arrangement, an operating force according to the operation input command is hydraulically imparted to the pilot valve 14.

A differential pressure generating means 30 for generating differential pressure according to the flow rate in the main fluid passage 4 is disposed in the main fluid passage 4 at the side thereof adjacent to the outlet port 3. The differential pressure generating means 30 has a displacement member 32 which is supported by a guide 31 integral with the housing 5 for reciprocal movement in the direction of fluid flow. A spring 33 is arranged between the guide 31 and the displacement member 32 which urges the displacement member 32 is the direction opposite to the direction of fluid flow. The displacement member 32 cooperates with a curved wall surface 34 of the main fluid passage 4 to define a fluid passage whose opening area increases with an increase in the stroke of travel of the displacement member 32. The wall surface 34 of the main fluid passage 4 has a shape such as to assume a root function of $\alpha\sqrt{x}(\alpha$: a constant) or a function approximate to the root function with respect to the stroke of travel of the displacement member 32.

The displacement member 32 also serves as a check valve, and, in its inoperative position shown in FIG. 1, is engaged with the valve seat 35 formed in the housing 5 to hydraulically isolate a passage portion 36 between the main valve member 8 and the displacement member 32 from the outlet port 3.

As described above, the pilot valve 14 and the displacement member 32 of the differential pressure generating means 20 is coaxially aligned with the main valve member 8 interposed between the pilot valve 14 and the displacement member 32.

The flow control valve apparatus 1 has a control means 40 for controlling the operating force of the pilot valve 14 in accordance with the differential pressures generated in the differential pressure generating means 30. The control means 40 is constituted by a tension spring 41 which extends through the through passage 13 in the main valve member 8 to connect the displacement member 32 of the differential pressure generating means 30 and the valve member 15 of the pilot valve 14 as well as to urge the displacement member 32 and the pilot valve member 15 toward each other with the main valve member 8 therebetween. The tension spring 41 transmits the differential pressure generated in the differential pressure generating means 30 to the pilot valve member 15 as a spring force that corresponds to the displacement of the displace body 32. Thus, the operating force of the pilot valve 14 is mechanically controlled in correspondence with the differential pressure generated.

The flow control valve apparatus 1 having the above construction can be incorporated into a meter-in hydraulic control system, for example, by connecting the inlet port 2 to a hydraulic pump 50 while connecting the outlet port 3 to the head side of a hydraulic cylinder 51.

A hydraulic pilot device 52 having an ordinary construction may be employed as an operating means for controlling the pilot valve 14. In this case, a hydraulic pilot line 53 which extends from one side of the hydraulic pilot device 52 is connected to the control passage 23, and the control passage 24 is connected to a tank (not shown). Thus, the pilot pressure Pc1 that corresponds to the one-directional operation input command of the hydraulic pilot device 52 is introduced into the control passage 23, and the pressure in the control passage 24 is maintained at the pressure Pc2 equivalent to a tank pressure. A hydraulic pilot line 54 which extends from the other side of the hydraulic pilot device 52 may be introduced into a pilot valve of a flow control valve apparatus (not shown), similar to the flow control valve apparatus 1, which is connected to the bottom side of the hydraulic cylinder 51.

The operation of the flow control valve apparatus 1 will be described below.

If the hydraulic pilot device 50 is not operated, and hence, the pilot pressures Pc1 and Pc2 are not developed, the valve member 15 of the pilot valve 14 is maintained in contact with the valve seat 16 and the auxiliary passage 13 is closed by the pilot valve 14. Therefore, a flow of fluid does not occur in the orifice 12 which places the inlet port 2 in communication with the backpressure chamber 11, and therefore, the backpressure chamber 11 and the inlet port 2 are maintained in the same pressure condition. Thus, the main valve member 8 is urged in the valve-closing direction by virtue of the difference between the pressure receiving area of the end surface 10A of the radially enlarged rear portion 10 of the main valve member 8 which surface exposes to the backpressure chamber 11 and the pressure receiving area of an annular end surface 10B of the rear portion 10 that is nearer to the inlet port 2, so that the main valve member 8 is located in a closed position in which the main valve member 8 is maintained in contact with the valve seat 9.

In this state, when the pilot pressure Pc1 corresponding to the operation input command is generated by operating the hydraulic pilot device 50, the pilot pressure Pc1 is introduced into the first pressure chamber 20 and the second pressure chamber 21 of the pilot valve 14 through the control passages 23 and 24, respectively. Thus, an operating force proportional to a pilot operation input is imparted to the pilot valve member 15. This operating force is represented by the equation of Fc=A(Pc1-Pc2), where A is the area of the annular end surface of the piston portion 18 and Pc2 is the tank pressure as described previously.

When the operating force Fc corresponding to the operation input command is imparted to the pilot valve 14, the pilot valve member 15 is moved upwardly in the direction away from the valve seat 16 so that the auxiliary passage 13 is opened. Thus, the backpressure chamber 11 is placed into communication with the passage portion 36 through the auxiliary passage 13, and a high pressure equivalent to the high pressure in the inlet port 2 of the backpressure chamber 11 acts upon the passage portion 36 to press and move the displacement member or check valve 32 downwardly as viewed in FIG. 1. Thus, the check valve 32 is opened to form a pilot flow along which the fluid in the inlet port 2 flows through the orifice 12, the backpressure chamber 11, the auxiliary passage 13 and the passage portion 36 into the outlet port 3. In this case, since the fluid flowing from the inlet port 2 into the backpressure chamber 11 is restricted by the orifice 12, a pressure difference occurs between the inlet port 2 and the backpressure chamber 11. The fluid pressure in the backpressure chamber 11 is reduced as compared with the fluid pressure in the inlet port 2. When forces acting upon the annular end 10B and the head end 8A of the valve member 8 becomes greater than the force acting upon the end surface 10A of the rear portion 10 as the result of such a pressure drop in the backpressure chamber 11, the main valve member 8 is moved upwardly as shown in FIG. 1 to cause the valve 1 to open. Thus, the inlet port 2 is placed into communication with the passage portion 36 and the fluid in the inlet port 2 flows through the main fluid passage 4 into the passage portion 36. The fluid flowing into the passage portion 36 presses and moves the displacement member 32 downwardly as viewed in FIG. 1 against the force of the spring 33, and flows into the outlet port 3. In consequence, the flow rate of fluid passing through the main fluid passage 4 is sensed as a differential pressure by the differential pressure generating means 30. In other words, the differential pressure determined by the shape of the wall surface 34 is produced in the upstream and downstream sides of the displacement member 32 and, at the same time, the displacement member 32 is moved to a displacement position that corresponds to the differential pressure. The tension spring 41 is expanded by the movement of the displacement member 32 and a spring force that corresponds to the displacement of the displacement member 32 is imparted to the pilot valve member 15. In consequence, the pilot valve member 15 is pulled toward the valve seat 16 and the opening of the pilot valve 14 is reduced. More specifically, the operating force Fc of the pilot valve 14 is regulated to become small by an amount equivalent to the spring force of the tension spring 41, and the pilot valve 14 assumes an opening that corresponds to the regulated operating force. Thus, the fluid flowing from the backpressure chamber 11 into the auxiliary passage 13 is restricted, and the pressure in the backpressure chamber 11 rises to cause the main valve member 8 to move in the valve-opening direction, thereby decreasing the opening of the main valve 6 and thereby suppressing an increase in the flow rate of fluid flowing in the main fluid passage 4. In this manner, the opening of the main valve member 8 is determined, depending upon the state of balance between the operating force Fc imparted to the pilot valve 14 and the spring force of the spring 41 so that the flow rate corresponding to the operating force Fc is obtained.

The shape of the wall surface 34 of the main fluid passage 4 is selected so that the opening area formed between the displacement member 32 and the wall surface 34 may assume a root function or a function approximate to the root function with respect to the stroke of travel of the displacement member 32. Accordingly, it is possible to provide flow characteristics whereby the flow rate and the displacement of the displacement member 32 assume an approximately linearly proportional relationship and, as described later, the flow rate and the operating force Fc of the pilot valve 14 assume an approximately linear proportional relationship.

In this state, when the fluid pressure in the inlet port 2 rises and the differential pressure between the inlet port 2 and the outlet port 3 increases, the flow rate of fluid passing through the main fluid passage 4 transiently increases. The increase in the flow rate is sensed as an increase in the differential pressure by the differential pressure generating means 30, and the differential pressure between the flows upstream and downstream of the displacement member 32 increases and simultaneously the displacement of the displacement member 32 increases. Thus, the operating force Fc of the pilot valve 14 is regulated to become small by an amount equivalent to the spring force of the tension spring 41, and the pilot valve 14 assumes an opening that corresponds to the regulated operating force. Therefore, the pressure in the backpressure chamber 11 rises to cause the opening of the main valve 6 to decrease, thereby suppressing an increase in the flow rate of fluid flowing in the main fluid passage 4. In this manner, it is possible to ensure a predetermined flow rate that corresponds to the operating force Fc of the pilot valve 14, irrespective of an increase in the differential pressure between the inlet port 2 and the outlet port 3, so that a pressure compensation function can be provided.

The above-described operation is represented by equations which will be described later. In the equations, the quantity of each state, areas, and constants are represented by the following symbols:

- Fc: operating force generated at the pilot valve 14 by the pilot pressures Pc1 and Pc2,
- x: displacement of the displacement member 32 with respect to the housing 5,
- y: displacement of the pilot valve member 15 with respect to the housing 5,
- y0: displacement of the pilot valve member 15 with respect to the housing 5,
- z: displacement of the main valve member 8 with respect to the housing 5,
- $\Delta P$: differential pressure between the inlet port 2 and the main fluid passage portion 36,
- $\Delta Pc$: differential pressure between the main fluid passage portion 36 and the inlet port 3,
- Q1: flow rate of fluid flowing from the inlet port 2 through the main fluid passage 4 into the passage portion 36,
- Q2: flow rate of fluid flowing from the passage portion 36 into the outlet port 3,
- A(X): cross sectional area of the fluid passage between the displacement member 32 and the wall surface 34 of the passage portion 36,
- AFM: pressure receiving area of the displacement member 32,
- $\rho$ fluid density, $C_1$, $C_2$, $C_3$, $C_4$ and $C_5$ constants each determined by the shape of the wall surface 34,
- q: flow rate of fluid passing through the orifice 12, that is, the pilot flow rate, and
- kf: total spring constant of the springs 33 and 41 (if the spring constant of the spring 33 is k33 and the spring constant of the spring 41 is k41, kf=k41-k33).

Equation (1) is first obtained since the operating force Fc acting upon the pilot valve member 15 (the valve spool 17) balances with the total spring force kf of the springs 33 and 41:

$$Fc = kf(x+y) \quad (1)$$

Flow rates Q1 and Q2 are respectively represented by the following equations:

$$Q_1 = C_1 \cdot Z \sqrt{\frac{2}{\rho} \cdot \Delta P} \quad (2)$$

$$Q_2 = C_2 \cdot A(x) \cdot \sqrt{\frac{2}{\rho} \cdot \Delta Pc} \quad (3)$$

If pilot flow rate q and flow rate Q1 is q<<Q1, Q1=Q2 is obtained. Therefore, the following equation is obtained from the above equations (2) and (3):

$$Z = C_3 \cdot A(x) \cdot \sqrt{\frac{\Delta Pc}{\Delta Pc}} \quad (4)$$

Displacements z, y and y0 assume the following relationship:

$$z = y - y0 \quad (5)$$

Since y0/y<<1, $z \approx y$ is obtained ad the above equation (4) becomes:

$$y = C_3 \cdot A(x) \sqrt{\frac{\Delta Pc}{\Delta Pc}} \quad (6)$$

From the above equations (1) and (6), we have:

$$Fc = kf\left(x + C_3 \cdot A(x) \sqrt{\frac{\Delta Pc}{\Delta Pc}}\right) \quad (7)$$

where, if $\Delta P >> Pc$, the above equation (7) becomes:

$$Fc = kf \cdot x \quad (8)$$

The balance between the differential pressure $\Delta Pc$ acting upon the displacement member 32 and the operating force Fc provides:

$$Fc = AFM \Delta Pc \quad (9)$$

The shape of the wall surface 34 is, as described previously, formed so that the opening area between the displacement 32 and the wall surface 34 assumes a root function with respect to the stroke of travel of the displacement member 32. Thus, $$A(x) = C_4 \sqrt{x} = C_4 \sqrt{Fc/kf} \quad (10)$$

Therefore, from the above equations (3), (9) and (10), we have:

$$Q_2 = C_5 \cdot \sqrt{\frac{Fc}{kf}} \cdot \sqrt{\frac{2}{\rho} \cdot \frac{Fc}{AFM}} \quad (11)$$
$$= C_5 \sqrt{\frac{2}{\rho kf AFM}} \cdot Fc$$

It is understood from the above equation (11) that the flow rate Q2 is linearly proportional to the operating force Fc. It is therefore possible to provide flow characteristics which are linearily proportional to the operating force Fc of the pilot valve 14. In addition, it is understood from the above equation (11) that the flow rate Q2 is not influenced by the differential pressure $\Delta P$, and it is therefore possible to keep the flow rate Q2 constant with respect to an increase in the differential pressure $\Delta P$, whereby a pressure compensation function can be provided.

It is to be noted that the main valve 6 is in general influenced by a flow force. If the influence is taken into account, a functional equation $f(\Delta P)$ of the differential pressure $\Delta P$ is added to the above equation (11), and the following equation is obtained:

$$Q_2 = C_5 \sqrt{\frac{2}{\rho AFM}\left(\frac{Fc^2}{kf} \pm f(\Delta P)\right)} \quad (12)$$

It is understood from equation (12) that, even if the influence of the flow force exists, the flow rate Q2 is approximately linearly proportional to the operating force Fc. It is therefore possible to provide flow characteristics which are approximately linearly proportional to the operating force Fc of the pilot valve 14. In the above equation (12), the flow force depends upon the shape of the seat portion of the main valve 6 and, therefore, the flow rate Q2 can be slightly made to depend upon the differential pressure ΔP by varying that shape. In this fashion, it is possible to achieve a pressure compensation function which can ensure a flow rate assuming a predetermined relationship with an increase in the differential pressure ΔP. In addition, if the flow rate Q2 is made to slightly depend upon the differential pressure ΔP, it is possible to accomplish the flow characteristics required for the hydraulic cylinder 51 of a particular type.

As described above, the flow control valve apparatus 1 according to the first embodiment is capable of achieving flow characteristics which are approximately linearly proportional to an operation input command as well as a pressure compensation function which ensures an approximately constant flow rate with respect to an increase in the differential pressure. The flow control valve apparatus 1 needs neither a pressure compensation valve nor a slit of an adjustable orifice type, and hence, has a relatively simple structure provided with the displacement member 32 and the springs 33 and 41. Similarly, since the auxiliary passage 13 is provided as the passage which extends through the main valve member 8, the construction of the passage is simplified. Accordingly, it is possible to reduce the number of manufacturing steps and hence the cost of production. In addition, an increase in the flow rate is sensed directly by the differential pressure generating means 30 disposed in the main fluid passage 4, in place of a pressure compensation valve for controlling the pilot flow rate, to thereby compensate for differential pressure. Accordingly, it is possible to achieve a differential-pressure compensation which excels in follow-up performance, In the above-described embodiment, the displacement member 32 also serves as a check valve. Therefore, even if, at the time of valve opening, the fluid pressure in the outlet port 3 becomes higher than that in the inlet port 2, the fluid in the outlet port 3 is prevented from leaking into the inlet port 2. Accordingly, the flow control valve apparatus 1 is suitable for incorporation in a meter-in hydraulic control system.

Furthermore, in the first embodiment, since the main valve member 8 is provided with the movable valve seat 16, the opening of the main valve 6 is, at the time of transient operation, regulated directly by controlling the operating force of the pilot valve 14. Thus, the period required until the steady state is reached is shortened, and response is improved. Also, the amount of internal leakage is reduced to an extreme extent since the main valve 6 is formed as a seat valve. Therefore, the first embodiment is also suitable for incorporation in a high pressure hydraulic control system. In addition, the pilot valve 14 and the displacement member 32 of the differential pressure generating means 30 are arranged coaxially with each other with the main valve member 8 interposed therebetween. Accordingly, it is possible to achieve the rational arrangement of the respective members, and hence, to make compact the flow control valve apparatus 1.

Figure 2:
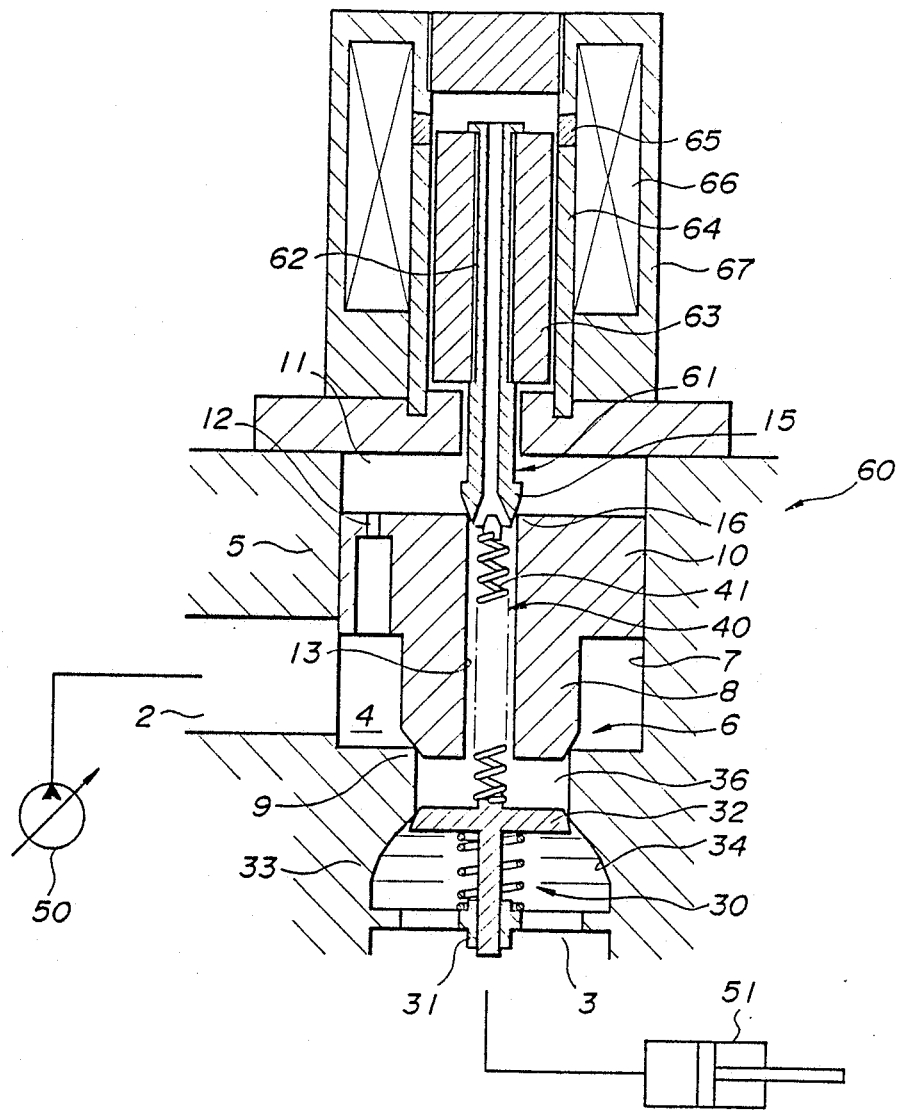
FIG. 2 is a cross-sectional view of a flow control valve apparatus according to a second embodiment of the present invention.

FIG. 2 is a sectional view showing a second embodiment of the present invention. In FIG. 2, like reference numerals are used to denote the like or corresponding members which are shown in FIG. 1, and in the remaining figures which illustrate embodiments which will be described later, although not stated, the same members are indicated by the same reference numerals used in FIG. 1.

In a flow control valve apparatus 60 according to the second embodiment, a pilot valve 61 is actuated by an electromagnetic drive means. A plunger 63 is fitted onto a valve sleeve 62 integral with the valve member 15 of the pilot valve 61, and the plunger 63 is surrounded by an inner sleeve 64 and a nonmagnetic ring 65. The inner sleeve 64 and the nonmagnetic ring 65 are surrounded by a coil 64, and an outer sleeve 67 is disposed with the coil 64 interposed between the outer sleeve 67 and the inner sleeve 64 as well as the nonmagnetic ring 65. In this embodiment, the plunger 63, that is, the valve member 15 of the pilot valve 61 moves in correspondence with the magnitude of an electrical current flowing in the coil 66.

In a differential pressure generating means 30, a wall surface 34 of the main fluid passage 4 is formed by a combination of a plurality of flat surfaces so that the wall surface 34 may be readily worked. The shape of the wall surface 34 is selected so that the opening area between the displacement member 32 and the wall surface 34 may assume a function approximate to a root function with respect to the stroke of travel of the displacement member 32. The construction of the remaining portion is similar to that of the first embodiment shown in FIG. 1.

The embodiment shown in FIG. 2 is identical to the embodiment shown in FIG. 1 except for the drive means for the pilot valve 61 and the shape of the wall surface 34 of the differential pressure generating means 30. Accordingly, it is possible to achieve a pressure compensation function capable of ensuring a predetermined flow rate without the need to incorporate a pressure compensation valve or a slit of an adjustable orifice type, whereby the second embodiment provides the same effect and function as those of the embodiment shown in FIG. 1.

Figure 3:
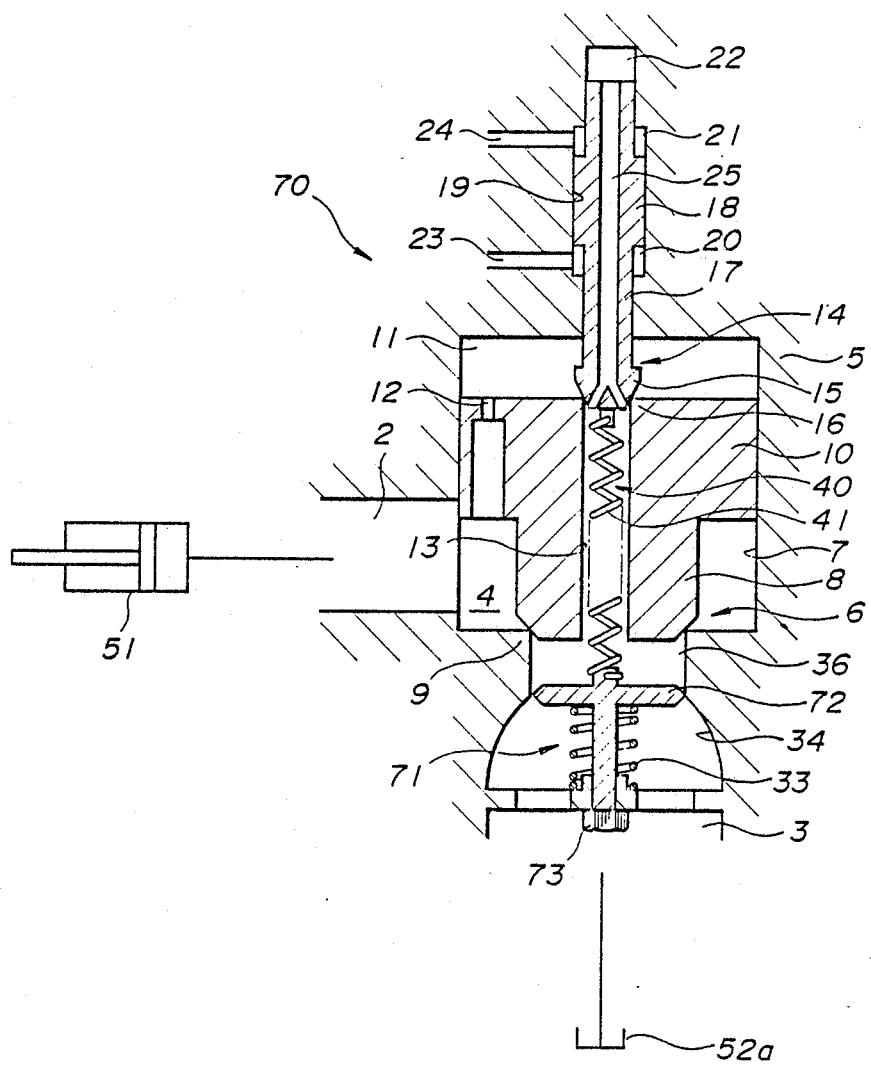
FIG. 3 is a cross-sectional view of a flow control valve apparatus according to a third embodiment of the present invention.
Figure 4:
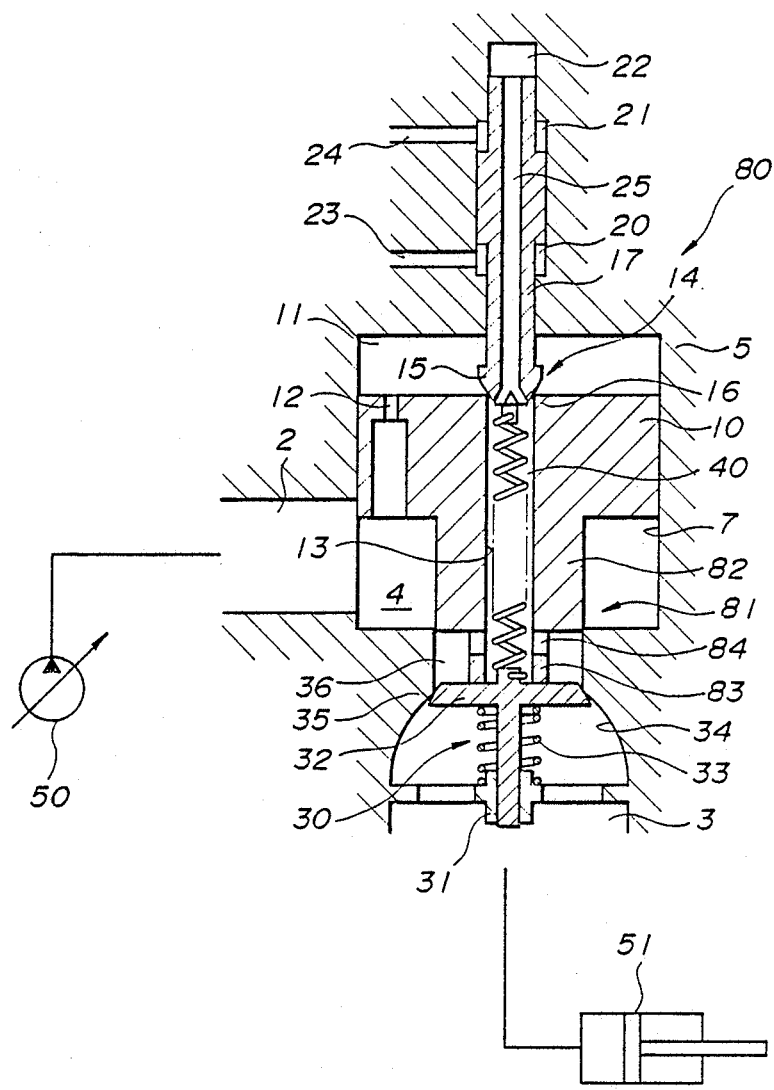
FIG. 4 is a cross-sectional view of a flow control valve apparatus according to a fourth embodiment of the present invention.

FIGS. 3 and 4 are sectional views respectively showing third and fourth embodiments of the present invention.

The third embodiment shown in FIG. 3 is of the type that is suitable for incorporation in a meter-out control system. A flow control valve apparatus 70 includes a differential pressure generating means 71 having a displacement member constituted by a cone 72, and the outer diameter of the cone 72 is selected to be smaller than the inner diameter of the passage portion 36. A stopper or nut 73 is tightly screwed onto the lower end of the shaft of the cone 72 for limiting the upward (in FIG. 3) movement of the cone 72. The inlet port 2 is connected to the hydraulic cylinder 51 while the outlet port 3 is connected to the tank 52a, to constitute a meter-out control system. The basic construction of the remaining portion is similar to that shown in FIG. 1.

The fourth embodiment shown in FIG. 4 is of the type that is suitable for incorporation with a meter-in control system. In a flow control valve apparatus 80 according to the fourth embodiment, the outer diameter of the portion of a valve member 82 of a main valve 81 that faces the outlet port 3 is selected to be smaller than the inner diameter of the passage portion 36, whereby a portion of the fluid in the outlet portion 3 is allowed to enter the passage portion 36. A stopper or flange 83 is provided at the lower end of the valve member 82 of the main valve 81 in such a manner that the flange 83 can come into and out of contact with the displacement member 32 serving as a check valve. The flange 83 has a communication hole 84 which communicates with the outlet port 3. In other words, the construction of the flow control valve apparatus 80 is such that the main valve 81 has no seat portion.

Similar to the first embodiment shown in FIG. 1, the embodiments shown in FIGS. 3 and 4 are capable of providing pressure compensation functions without the need to incorporate a pressure compensation valve or a slit of an adjustable orifice type.

A fifth embodiment of the present invention will be described below with reference to FIG. 5. A flow control valve apparatus 90 according to the fifth embodiment further includes a fixed guide 91 projecting from a wall portion which forms the backpressure chamber 11 of the housing 5 into the through hole 13 formed in the main valve member 8, the fixed guide 91 being slidably inserted into the through hole 13 in a sealed manner. A through hole 92 is coaxially formed in the fixed guide 91. The upper end of the through hole 92 communicates with a pressure chamber 93 in which the valve member 15 of a pilot valve 96 is located, while the lower end communicates with the through hole 13 in the main valve member 8. The pressure chamber 93 communicates with the backpressure chamber 11 through a passage 94. In this manner, the through holes 13 and 92, the pressure chamber 93 and the passage 94 constitute an auxiliary passage which allows communication between the backpressure chamber 11 and the passage portion 36 of the outlet port 3. A fixed valve seat 95 is provided at the end of the through hole 92 in the fixed guide 91 which end faces the pressure chamber 93, with the valve member 15 of the pilot valve 96 being brought into and out of contact with the fixed valve seat 95.

The flow control valve apparatus 90 according to the fifth embodiment is substantially the same as the flow control valve apparatus according to the previously-described embodiments except that the fixed guide 91 having the fixed valve seat 95 is incorporated. Accordingly, it is possible to achieve a pressure compensation function capable of ensuring a predetermined flow rate without the need to incorporate a pressure compensation valve or a slit of an adjustable orifice type.

Since the fifth embodiment uses the fixed valve seat 95, alignment of the axes of the pilot valve member 15 and the valve seat 95 needs only to be implemented. This makes it easy to manufacture flow control valve apparatus.

Figure 6:
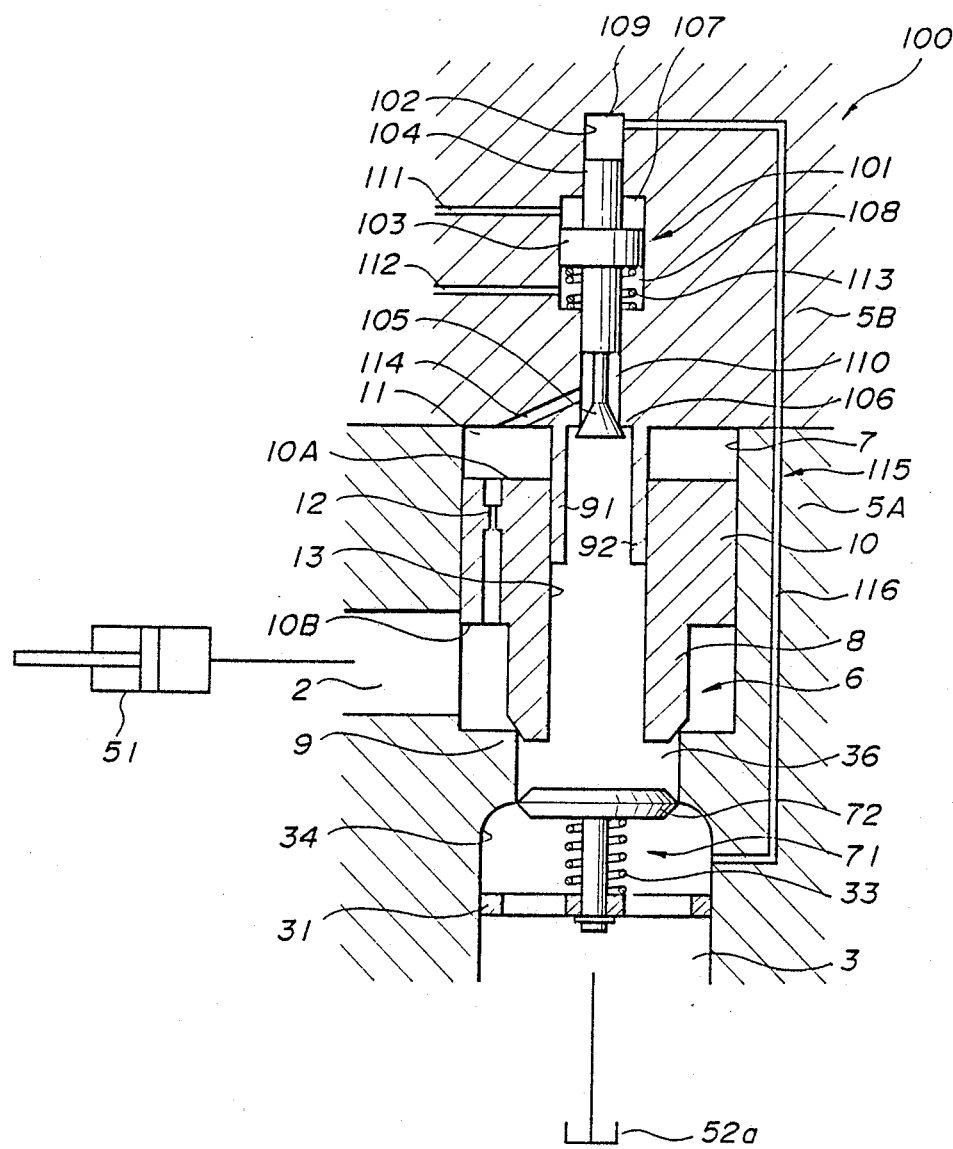
FIG. 6 is a cross-sectional view of a flow control valve apparatus according to a sixth embodiment of the present invention.

A sixth embodiment of the present invention will be described below with reference to FIG. 6. In each of the above-described embodiments, the differential pressure generated by the differential pressure generating means is detected as a displacement and, on the basis of the displacement, the operating force acting upon the pilot valve is mechanically controlled through the spring means. However, the operating force of the pilot valve can also be hydraulically controlled directly by the differential pressure generated by the differential pressure generating means. FIG. 6 shows the sixth embodiment capable of providing such control.

Specifically, a flow control valve apparatus 100 has two housings, that is, a housing 5A on the main-valve side and a housing 5B on the pilot-valve side. Similar to the embodiments shown in FIGS. 1 and 3, the housing 5A includes the main valve 6, the differential pressure generating means 71 and the like.

The housing 5B has a pilot valve 101. The pilot valve 101 has a valve spool 104 with a piston portion 103 which is slidably disposed in a pilot cylinder 102 formed in the housing 5B, a poppet portion 105 as a valve member which projects into the through hole 13 in the main valve member 8, and a valve seat 106 integral with the housing 5B, the poppet portion 105 being brought into and out of contact with the valve seat 106. A first pilot pressure chamber 107 and a second pilot pressure chamber 108 are formed on the opposite sides of the piston portion 103 of the pilot valve 101. A first pressure chamber 109 is formed in the pilot valve 101 at the upper end thereof as viewed in FIG. 6, while a second pressure chamber 110 is formed in the vicinity of the poppet portion 105. The first pilot pressure chamber 107 and the second pilot pressure chamber 108 are respectively connected to a first pilot channel 111 and a second pilot channel 112 through which fluid for driving the pilot valve 101 is introduced. A return spring 113 for urging the piston portion 103 upwardly as viewed in FIG. 6 is disposed in the second pilot pressure chamber 108. The aforementioned second pressure chamber 110 communicates with the backpressure chamber 11 through a channel 114 formed in the housing 5B.

The construction of the differential pressure generating means 71 is similar to that of the embodiment shown in FIG. 3, and the cone 72 is used as a displacement member. As described previously in FIG. 1, the shape of the wall surface 34 of the main fluid passage 4 is formed so that the opening area between the cone 72 and the wall surface 34 may assume a root function of $\alpha\sqrt{x}$ ($\alpha$: a constant) or a function approximate to the root function with respect to the stroke of travel of the cone 72.

A passage 116 which provides communication between the passage portion downstream of the cone 72 and the first pressure chamber 109 described above extends through the housings 5A and 5B to serve as a control means 115 for controlling the operating force of the pilot valve 101 in accordance with the differential pressure generated by the differential pressure generating means 71.

The sixth embodiment having the above-described arrangement is as follows.

When no pilot pressure is introduced into the pilot channels 111 and 112 of the pilot valve 101, the spring 113 urges the valve member or poppet portion 105 of the pilot valve 101 upwardly as viewed in FIG. 6, and the poppet portion 105 is tightly seated upon the valve seat 106. The pressure fluid in the inlet port 2 is introduced into the backpressure chamber 11 through the orifice 12 formed in the main valve member 8. Accordingly, the main valve member 8 is pushed downwardly in FIG. 6 owing to the area difference between the end surfaces 10A and 10B to come into contact with the valve seat 9, thereby shutting off the flow of fluid from the inlet port 2 to the outlet port 3.

When, in this state, pilot pressure is supplied to the first pilot pressure chamber 107 and the second pilot pressure chamber 108 through the first pilot channel 111 and the second channel 112 to impart an operating force Fc corresponding to an operation input command to the pilot valve 101, the poppet portion 105 of the pilot valve 101 is moved downward in FIG. 1 to cause the valve seat 106 to be opened. At this time, the fluid in the inlet port 2 flows into the passage portion 36 through the orifice 12, the backpressure chamber 11, the channel 114, and the second pressure chamber 110. The fluid pressure in the backpressure chamber 11 becomes lower than the fluid pressure in the inlet port 1 by virtue of the orifice 12. At this time, when the force acting upon the end surface 10A of the main valve member 8 overcomes the force acting upon the end surface 10B, the main valve member 8 moves upwardly in FIG. 1 and the fluid in the inlet port 2 flows into the passage portion 36. The fluid flowing into the passage portion 36 pushes the cone 72 of the differential pressure generating means 71 downwardly in FIG. 6 and flows into the outlet port 3. The fluid pressure in the outlet port 3 is introduced through the passage 116 into the first pressure chamber 109. In the meantime, the pressure upstream of the cone 72 is introduced into the second pressure chamber 110 through the through passage 13. Accordingly, the differential pressure generated on the sides upstream and downstream of the cone 72 is applied as a force to the valve spool 104 of the pilot valve 101. If a is the cross-sectional area of the pilot cylinder chamber 102 and $\Delta P$ is the above-described differential pressure, the balanced state of forces at the valve spool 104 is:

$Fc = a \cdot \Delta P$ Therefore, a differential pressure $\Delta P$ that corresponds to the operating force Fc of the pilot valve 101 is generated, and the flow rate that corresponds to the differential pressure $\Delta P$ is obtained. In this case, in the steady state, the opening of the pilot valve 101 at the position of the poppet portion 105 is determined by the area ratio of the end surface 10A of the main valve member 8 to the end surface 10B thereof, the opening of the orifice 12, and the angle of the slope of the poppet portion 105. The opening of the main valve member 8 is determined by the opening defined between the cone 72 and the wall surface 34 and the differential pressure between the inlet port 2 and the passage port 36.

In this state, if the pressure in the inlet port 2 rises and the differential pressure between the fluids in the inlet port 2 and the passage portion 36 rises, the flow rate of fluid passing through the portion 36 tends to increase. Thus, the cone 72 is pushed downwardly in FIG. 6 against the spring 33 and the differential pressure between the fluids in the passage portion 36 and the inlet port 3 rises. Therefore, the valve spool 104 of the pilot valve 101 is moved upwardly in FIG. 6 to reduce the opening area of the pilot valve 101 at the poppet portion 105 thereof. In consequence, the pressure in the back-pressure chamber 11 rises to cause the main valve member 8 to move downwardly, thereby reducing the valve opening and thereby suppressing an increase in the flow rate. In this manner, it is possible to provide a desired flow rate corresponding to the operating force Fc irrespective of the differential pressure between the fluids in the inlet port 2 and the outlet port 3.

This fact can be represented by the following equation. On the basis of the shape of the wall surface 34, an opening area A between the cone 72 and the wall surface 34, as described previously, is represented by:

$$A = a\sqrt{x}$$

If the flow rate of fluid flowing through this opening area is Q, we have:

$$Q = C \cdot A \cdot \sqrt{\Delta P} = C \cdot a \cdot \sqrt{x} \cdot \sqrt{\Delta P}$$

wherein C is the constant determined by the fluid density and the shape of the wall surface 34. Further, if k is the spring constant of the spring 33, $\Delta P$ is represented by:

$$\Delta P = kx/Ap$$

wherein Ap is the pressure receiving area of the cone 72. Therefore, we have:

$$Q = C \cdot a \cdot \sqrt{Ap/k} \cdot \Delta P$$

From the previously-described $Fc = a \cdot \Delta P$, the following equation is obtained:

$$Q = C \cdot a \cdot (1/a) \cdot \sqrt{Ap/k} \cdot Fc$$

Similar to the previously-described equation (11), it will be understood from the above equations that the flow rate Q is linearily proportional to the operating force Fc, and it is therefore possible to provide flow characteristics which are linearly proportional to the operating force Fc of the pilot valve 14. It is likewise understood from the above equations that the flow rate Q is not influenced by the differential pressure $\Delta P$, and it is possible to keep the flow rate Q constant even if the differential pressure $\Delta P$ increases, whereby a pressure compensation function can be provided.

If the influence of flow force is taken into account, a similar equation to the previously-described equation 12 having a functional equation $f(\Delta P)$ of the differential pressure $\Delta P$ is obtained. As explained in conjunction with equation (12), the flow rate Q2 can be slightly made to depend upon the differential pressure $\Delta P$ by varying the shape of the seat portion of the main valve 6 and utilizing the flow force. In this fashion, it is possible to achieve a pressure compensation function which can ensure a flow rate assuming a predetermined relationship with an increase in the differential pressure $\Delta P$, as well as to accomplish the flow characteristics required for the hydraulic cylinder 51 of a particular type.

As described above, in accordance with the sixth embodiment, it is possible to achieve flow characteristics proportional to an operation input command as well as a pressure compensation function which ensures a flow rate which assumes predetermined relationship with respect to an increase in the differential pressure. Accordingly, the sixth embodiment is capable of achieving the same effect and function as those of the embodiment shown in FIG. 1.

Figure 7:
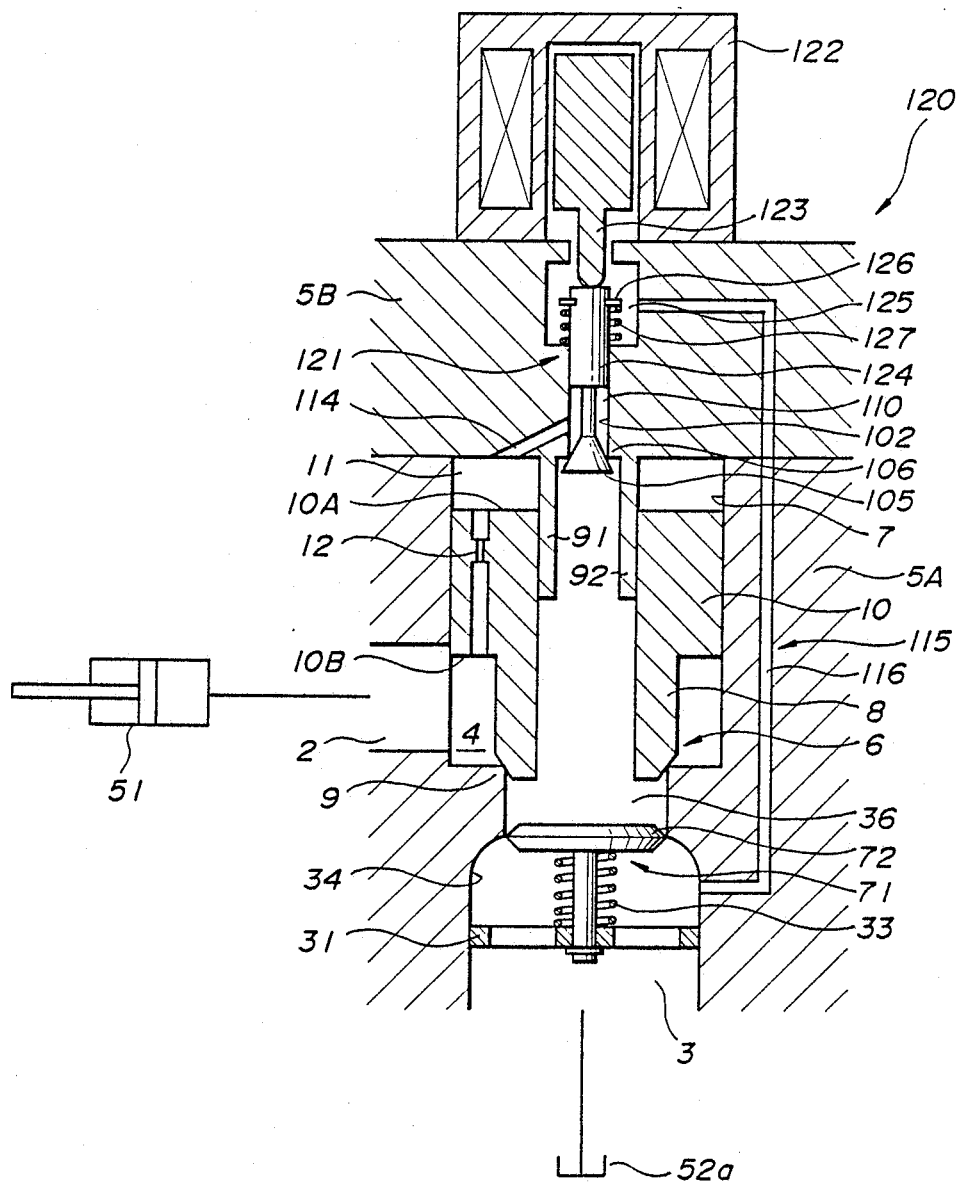
FIG. 7 is a cross-sectional view of a flow control valve apparatus according to a seventh embodiment of the present invention.

A seventh embodiment of the present invention will be described below with reference to FIG. 7. A flow control valve apparatus 120 according to the seventh embodiment differs from the embodiment shown in FIG. 6 in respect of a means for imparting the operating force Fc to a pilot valve 121. Specifically, a proportional solenoid valve 122 is mounted on the housing 5B, and one end of an output shaft 123 of the proportional solenoid valve 122 abuts against the end surface of a valve spool 124 of the pilot valve 121, and that end surface of the valve spool 124 is located in a pressure chamber 125 which is formed in the housing 5B so as to communicate with the channel 116. A spring receiving member 126 is mounted to the portion of the valve spool 124 that is adjacent to that end surface, and the return spring 127 is engaged with the spring receiving member 126 which is disposed in the pressure chamber 125 to urge the valve spool 124 upwardly as viewed in FIG. 7. The output shaft 123 of the proportional solenoid valve 122, the pilot valve 121, the main valve 6, and the differential pressure generating means 71 are arranged on the same axis. The construction of the remaining portion is similar to that of the previously-described embodiment shown in FIG. 6.

In the embodiment having the above-described construction, when an electric current is supplied to the proportional solenoid valve 122, the output shaft 123 is moved and thus the valve spool 124 of the pilot valve 121 is moved so that the poppet portion 105 is separated from the valve seat 106. Thus, it is possible to provide similar effect and function to those of the embodiment shown in FIG. 6.

Figure 8:
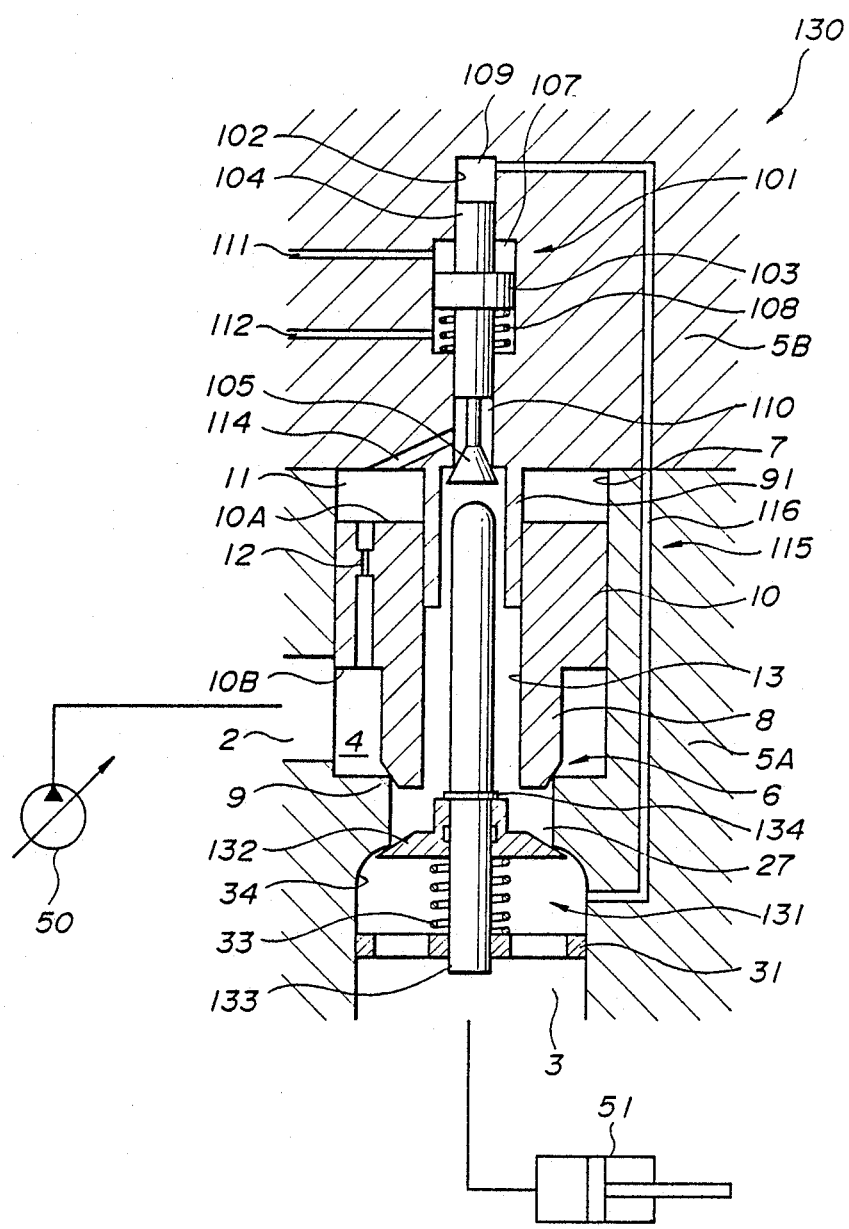
FIG. 8 is a cross-sectional view of a flow control valve apparatus according to an eighth embodiment of the present invention.

FIG. 8 is a sectional view showing an eighth embodiment of the present invention. A flow control valve apparatus 130 includes a differential pressure generating means 131 having a displacement member 132 constituted by a check valve engageable with a valve seat 133.

The displacement member 132 is movably fitted onto the pressing rod 133. The pressing rod 133 projects at one end thereof upstream of the displacement member 133 in such a manner that the one end can be pressed against the poppet portion 105 of the pilot valve 101; the other end of the pressing rod 133 projects downstream of the displacement member 133 and is movably supported on the guide plate 31. An annular stopper 134 is fixed to the pressing rod 133, and the stopper 134 engages with the displacement member 132 to restrict excessive downward movement of the pressing rod 133.

In addition to the function and effect of the embodiment shown in FIG. 6, in particular, the displacement member 132 serving as a check valve prevents the fluid in the outlet port 3 from flowing back into the inlet port 2 owing to backpressure imparted to the outlet port 3. If the operating force F of the pilot valve 101 is not imparted to the pressing rod 133, the pressing rod 133 is moved upwardly in FIG. 8 by the backpressure in the outlet port 3, and the upper end (as viewed in FIG. 8) of the pressing rod 133 is pressed into contact with the poppet 105 of the pilot valve 101 to push the poppet portion 105 upwardly as viewed in FIG. 8. It is thus possible to prevent fluid from flowing from the outlet port 3 back into the second pressure chamber 110.

A ninth embodiment of the present invention will be described with reference to FIG. 9.

In each of the above-described embodiments, the operating force of the pilot valve may be mechanically or hydraulically controlled in response to the outputs of the differential pressure generating means. However, the operating force may be electrically controlled. FIG. 9 shows the ninth embodiment employing such an electrically controlling means.

In a flow control valve apparatus 140 according to the ninth embodiment, a pilot valve 141 has a radially enlarged portion 143 integral with a valve spool 142, and a proportional solenoid 144 as an electromagnetic drive means is disposed around the radially enlarged portion 143. The end of the valve spool 142 on the side opposite to the valve member 15 is urged by a spring 145 in the valve-closing direction.

A differential pressure generating means 146 has a displacement member 147 which also serves as a check valve, and the displacement member 147 has a support rod 148 guided by the guide 31, and the spring 33 is disposed between the guide 31 and the displacement member 147. A sensing rod 149 is connected to the lower end of the support rod 148, and the sensing rod 149 extends into an electrical displacement sensing device 151 which is mounted on the bottom of the housing 5 and which is provided with a sensing coil 150. As described previously, the shape of the curved wall surface 34 of the main fluid passage 4 is formed so that the opening area between the displacement member 147 and the wall surface 34 may assume a root function of $\alpha\sqrt{x}$ ($\alpha$: a constant) or a function approximate to the root function with respect to the stroke of travel of the displacement member 147.

The displacement sensing means 151 constitutes one part of a control means 158 for controlling the operating force of the pilot valve 101 in correspondence with the differential pressure generated by the differential pressure generating means 146. A comparing arithmetic unit 152 is disposed as the other part of the control means 158. The comparing arithmetic unit 152 is connected to the displacement sensing device 151 and a command device (not shown) through signal lines 153 and 154, respectively, and is connected to a control driver 156 through a signal line 155. The control driver 156 is connected to the proportional solenoid 144 of the pilot valve 141 by the signal line 157.

Figure 10:
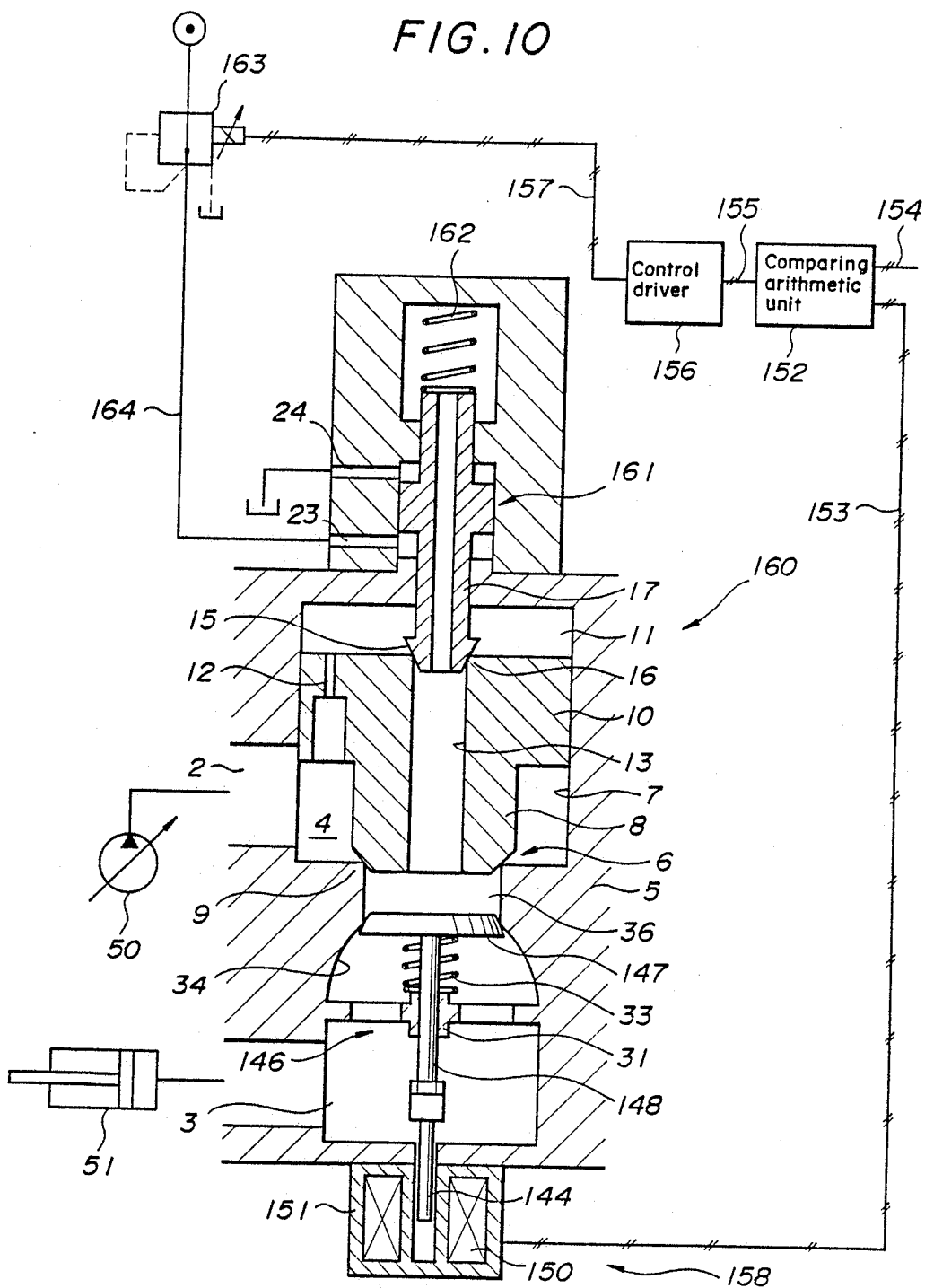
FIG. 10 is a cross-sectional view of a flow control valve apparatus according to a tenth embodiment of the present invention.

When a command signal corresponding to a desired flow rate Q is input to the comparing arithmetic unit 152 through the signal line 153, the comparing arithmetic unit 152 supplies an electrical signal corresponding to the command signals Q to the control driver 156 through the signal line 155. The control driver 156 converts a signal from the comparing arithmetic unit 152, for example, a voltage signal into a signal required to actuate the proportional solenoid 144, for example, a current signal, and outputs the resultant signal to the porportional solenoid 144 through the signal line 157. Thus, a thrust force which acts upwardly as viewed in FIG. 10 is applied to the valve spool 142 of the pilot valve 141, and the thrust force overcomes the counterforce of the spring 145 to cause the valve spool 142 and the valve member 15 to move upwardly as viewed in FIG. 10. The fluid in the inlet port 12 flows through the orifice 12, the backpressure chamber 11 and the through hole 13 into the passage portion 36, pushing the displacement member 147 downwardly, and then flowing into the outlet port 3. At this time, the pressure in the backpressure chamber 11 lowers due to a pressure drop provided by the orifice 12, and the main valve member 8 moves upwardly to allow the fluid in the inlet port 2 to flow through the passage portion 36 into the outlet port 3. The flow rate Qe at this time is sensed as a differential pressure by the cooperation between the displacement member 147 and the spring 33, and the differential pressure thus sensed is electrically sensed by the sensing rod 149 and the displacement sensing device 151. A sensed electrical signal xe corresponding to the displacement x of the displacement member 147 is input to the comparing arithmetic unit 152 through the signal line 153.

The characteristics of the displacement member 147 and the spring 33, that is, the relationship between the command flow rate Q and the displacement x is previously stored in the comparing arithmetic unit 152, in which the command flow rate Q is compared with the sensed displacement xe. For example, if the displacement xe which has been sensed with respect to the command flow rate Q is $x\pm\Delta x$, the value of an electrical signal equivalent to a flow rate $\Delta Q$ corresponding to $\Delta x$ is increased or reduced to the value of the preceding electrical signal, and the thus-obtained signal value is output to the control driver 156. More specifically, if the value of the sensed signal xe is greater than the amount of displacement x equivalent to the command flow rate Q, the value of output signals is reduced to cause the thrust force acting upon the pilot valve 14 to decrease. In consequence, the valve spool 142 and the valve member 15 is moved downwardly as viewed in FIG. 9 and the main valve member 8 is correspondingly moved downwardly, so that the flow rate of fluid flowing from the inlet port 2 to the outlet port 3 is decreased. On the other hand, if the value of the sensed signal xe is smaller than the amount of displacement x equivalent to the command flow rate Q, the value of output signals is increased to cause the thrust force acting upon the pilot valve 141 to increase. In consequence, the valve spool 142 and the valve member 15 is moved upwardly as viewed in FIG. 9 and the main valve member 8 is correspondingly moved upwardly, so that the flow rate of fluid flowing from the inlet port 2 to the outlet port 3 is increased. The above-described operation is repeated and, when the desired flow rate Q is reached, the valve mechanism is placed in a stationary position.

As described above, in the ninth embodiment, it is possible to achieve a pressure compensation function capable of ensuring flow characteristics proportional to the operation input command and a predetermined flow rate with respect to an increase in differential pressure without the need to incorporate a pressure compensation valve or a slit of an adjustable orifice type. Accordingly, the ninth embodiment also provides effects and functions similar to those of the embodiment shown in FIG. 1.

A tenth embodiment of the present invention will be described below with reference to FIG. 10.

Figure 9:
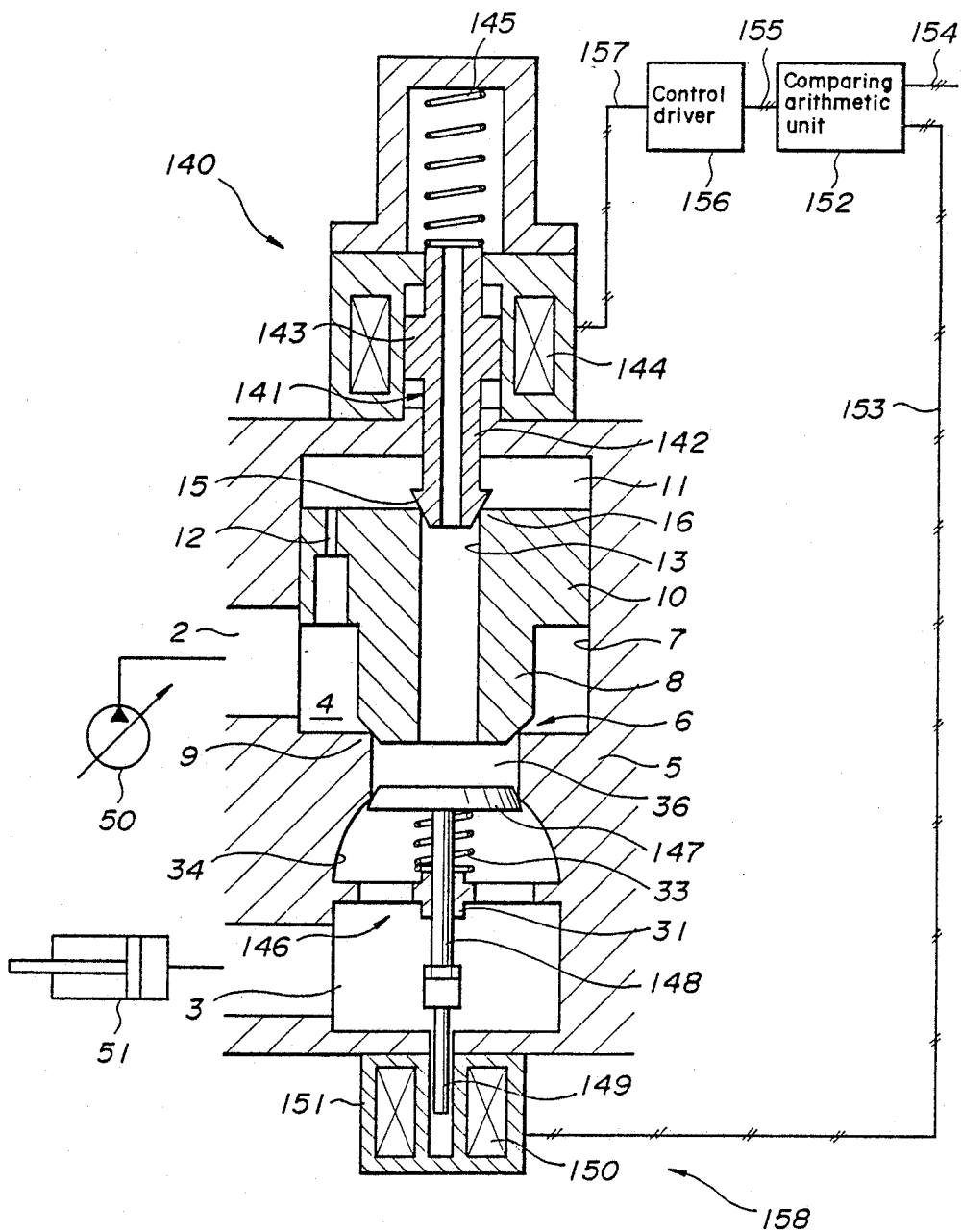
FIG. 9 is a cross-sectional view of a flow control valve apparatus according to a ninth embodiment of the present invention.

The pilot valve 141 in the embodiment shown in FIG. 9 is driven by a solenoid type drive means, but a hydraulic drive means may be used in place of the solenoid drive means. FIG. 10 illustrates the tenth embodiment employing such a hydraulic drive means.

A flow control valve apparatus 160 according to the tenth embodiment includes a hydraulically-operated pilot valve 161 having an arrangement similar to that of the embodiment shown in FIG. 1. The hydraulically-operated pilot valve 161 is substantially identical to the pilot valve shown in FIG. 1 except that a spring 162 for urging the valve spool 17 in the valve-closing direction is provided on the side of the pilot valve 161 opposite to the valve member 15. The control driver 156 is connected to a proportional solenoid pressure-reducing valve 163 through the signal line 157, and the proportional solenoid pressure-reducing valve 163 is connected to the control channel 23 for the pilot valve 161 through a pilot line 164. The proportional solenoid pressure-reducing valve 163 generates a pilot pressure proportional to an electrical signal supplied from the control driver 156 and supplies the pilot pressure to the pilot valve 161 for driving purposes.

Similarly to the embodiment shown in FIG. 9, with this arrangement, it is possible to electrically control the operating force of the pilot valve 161 in response to the outputs of the differential pressure generating means 146.

An eleventh embodiment of the present invention will be described below with reference to FIG. 11.

In a flow control valve apparatus 170 according to the eleventh embodiment, a differential pressure generating means 171 has a displacement member 172 serving also as a check valve and a rod member 173 integral with the displacement member 172, and the rod member 173 extends through a through hole 176 formed in a valve member 175 of a main valve member 174 and a through hole 180 formed in a valve member 178 of a pilot valve 177 and a valve spool 179, and projects from the side of the valve spool 179 opposite to the valve member 178. A compression spring 182 is disposed between a projecting end 181 and the end surface of the valve spool 179 opposite to the valve member 178. The rod member 173 and the compression spring 182 in combination with the displacement member 172 constitute the differential pressure generating means 171 as well as control means 183 for controlling the operating force of the pilot valve 177 in correspondence with the differential pressures generated by the differential pressure generating means 171. The projecting end 181 and the compression spring 182 are covered by a detachable, hermetically enclosing cover 184 which forms a balanced pressure chamber 185. The balanced pressure chamber 185 communicates with the main fluid passage portion 36 through a gap 186 between the pilot-valve through hole 180 and the rod member 173 and a communication passage 187 formed in the main valve member 175 to allow free movement of the rod member 173.

It will be readily understood that, in the eleventh embodiment, the compression spring 182 makes a similar action to that of the tension spring 41 used in the embodiment shown in FIG. 1. Accordingly, the eleventh embodiment also provides effects and functions similar to those of the embodiment shown in FIG. 1. In addition, in the eleventh embodiment, since the compression spring 182 is located outside of the pilot valve 177, it is possible to easily adjust the spring force of the compression spring 182 and to replace the compression spring 182.

Figure 11:
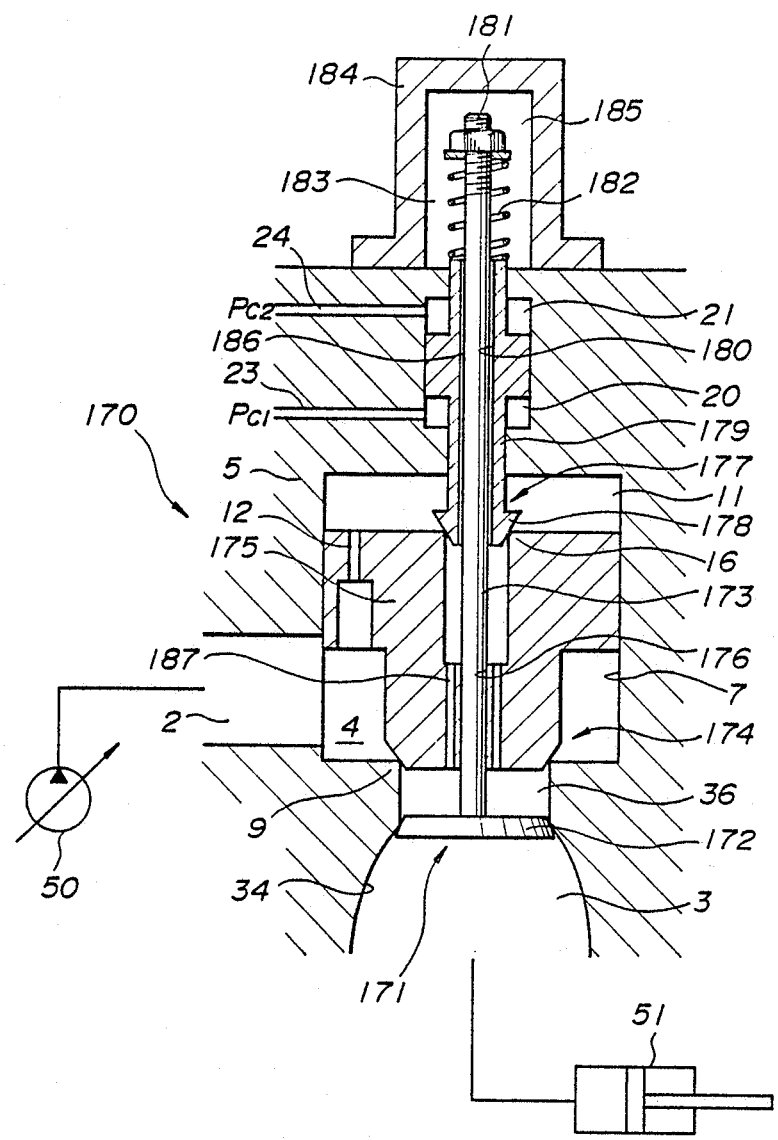
FIG. 11 is a cross-sectional view of a flow control valve apparatus according to an eleventh embodiment of the present invention.

The embodiment shown in FIG. 11 employs the control means 183 constituted by the rod member 173 and the compression spring 182 in place of the control means 40 constituted by the tension spring 41 of the embodiment shown in FIG. 1. However, the feature of the embodiment of FIG. 11 may be combined with the features of any of the previously-described embodiments.

Figure 12:
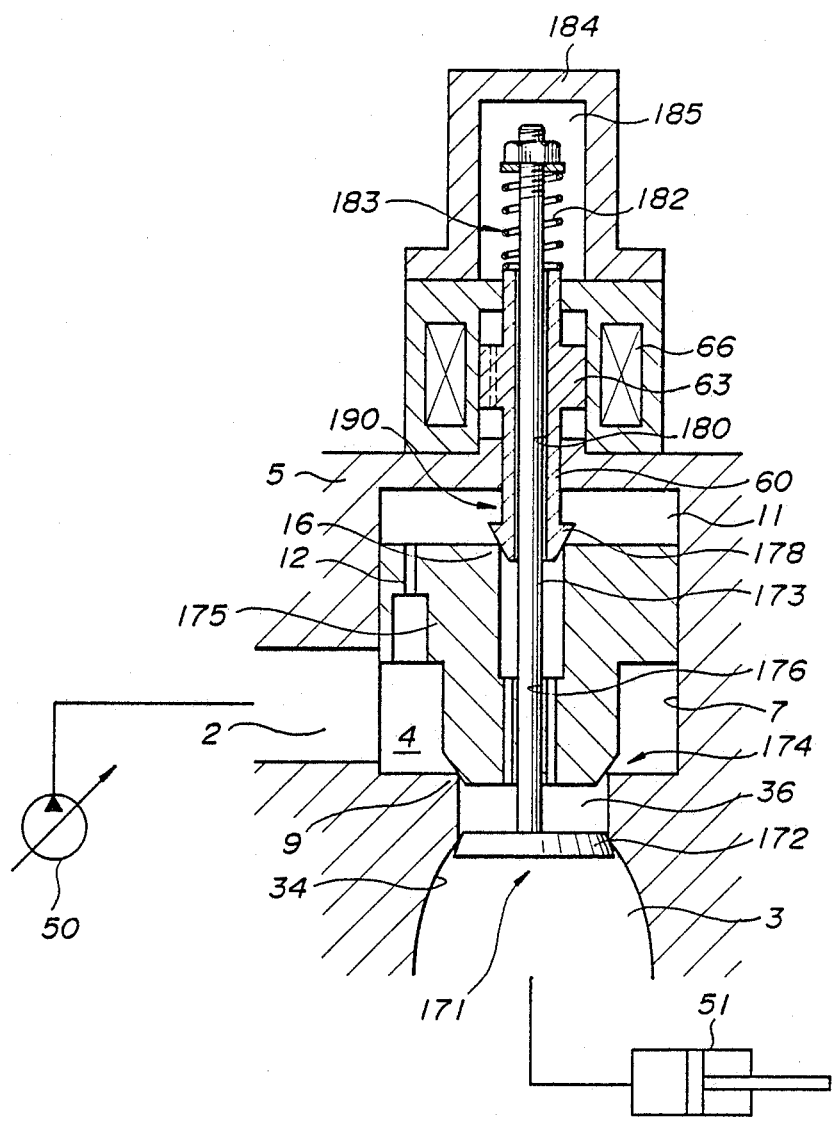
FIG. 12 is a cross-sectional view of a flow control valve apparatus according to a twelfth embodiment of the present invention.

FIG. 12 shows in cross section a twelfth embodiment in which the feature of the solenoid-operated pilot valve 61 shown in FIG. 2 is combined with the control means 183, and a solenoid-operated pilot valve is denoted by numeral 190. The solenoid drive section of the pilot valve 190 is illustrated in a simplified form, similarly to that of FIG. 9.

Figure 5:
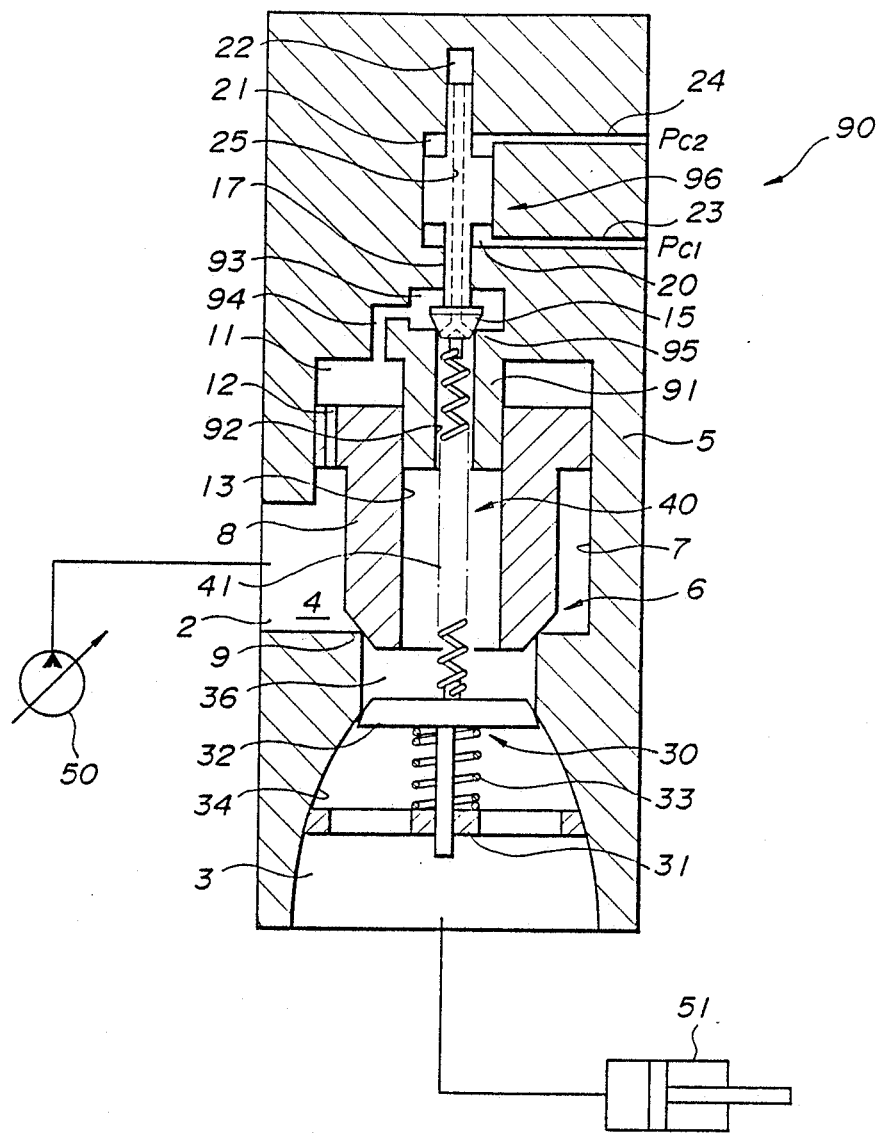
FIG. 5 is a cross-sectional view of a flow control valve apparatus according to a fifth embodiment of the present invention.
Figure 13:
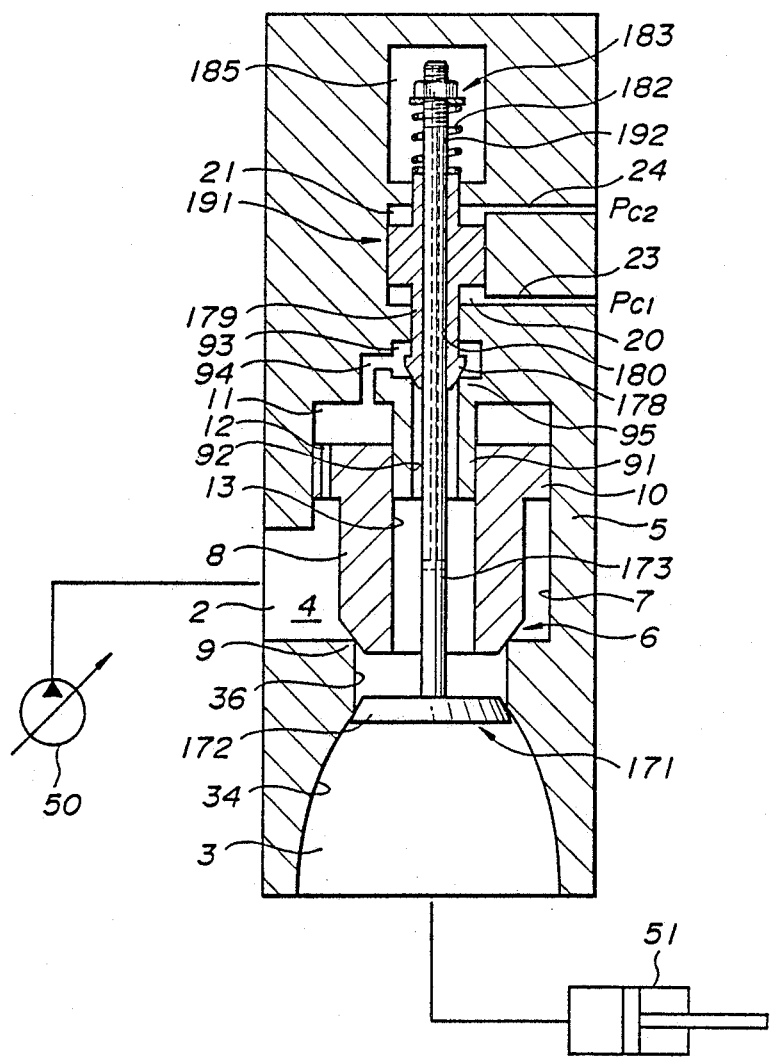
FIG. 13 is a cross-sectional view of a flow control valve apparatus according to a thirteenth embodiment of the present invention.

FIG. 13 shows in cross section a thirteenth embodiment in which the feature of the FIG. 5 hydraulically operated pilot valve 96 including the fixed valve seat 95 is combined with the control means 183, and a pilot valve is denoted by numeral 191. In this embodiment, the rod member 173 is slidably inserted into the through hole 183 of the pilot valve 191 in a sealed manner, and the rod member 173 has a axial passage 192 which is formed therein for provision of communication between the balanced pressure chamber 185 and the main fluid passage portion 36.

Figure 14:
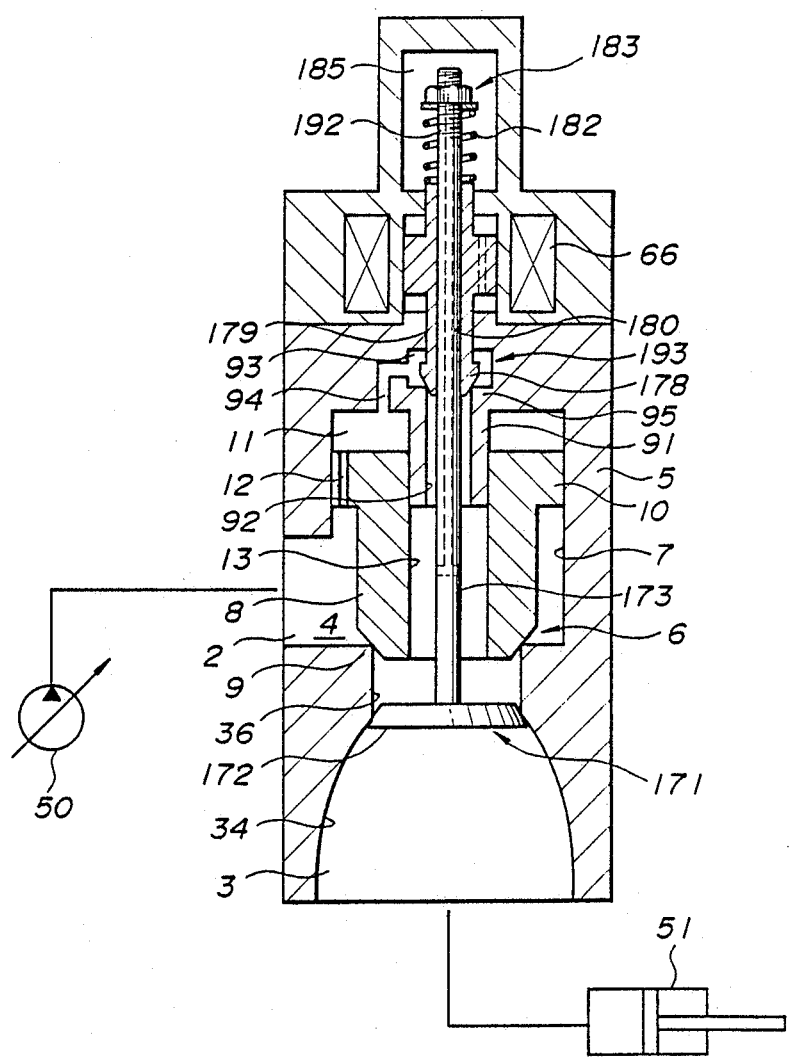
FIG. 14 is a cross-sectional view of a flow control valve apparatus according to a fourteenth embodiment of the present invention.

FIG. 14 shows in cross section a fourteenth embodiment in which the FIG. 5 pilot valve 96 including the fixed valve seat 95 is arranged as a solenoid-operated type such as that shown in FIG. 2, with the solenoid-operated arrangement combined with the control means 183. A pilot valve is denoted by numeral 191.

It will be obvious that any of the twelfth to fourteenth embodiments having the above-described combinations basically provides effects and functions similar to those of the embodiment shown in FIG. 1 and that these embodiments possess similar advantages to those of the embodiment of FIG. 11.

While the above provides a full and complete disclosure of the invention, various modifications, alternative constructions and equivalents may be employed without departing from the true spirit and scope of the invention. Therefore, the above description and illustrations should not be construed as limiting the scope of the invention, which is defined solely by the appended claims.

What is claimed is:

1. A flow control valve apparatus comprising:
    a housing including a main fluid passage having an inlet port and an outlet port;
    a main valve disposed between said inlet port and said outlet port for allowing or shutting off communication between said inlet port and said outlet port;
    a backpressure chamber formed between an inner wall of said housing and a rear portion of a valve member of said main valve, said backpressure chamber communicating with said inlet port through an orifice;
    an auxiliary passage for placing said backpressure chamber in communication with said outlet port;
    a pilot valve for actuating said main valve by controlling the opening and closing of said auxiliary passage and varying the fluid pressure in said backpressure chamber, a differential pressure generating means disposed in said main fluid passage for generating differential pressures that correspond to the flow rate in said main fluid passage, said differential generating means including a displacement member disposed for movement in the direction of fluid flow in said main fluid passage and spring means for urging said displacement member in the direction opposite to said direction of fluid flow, said displacement member cooperating with a wall surface of said main fluid passage to define a fluid passage having an opening area which increases with an increase in the stroke of travel of said displacement member; and external means for applying an input operating force to the pilot valve;
    control means for controlling the operating force of said pilot valve in correspondence with differential pressures generated by said differential pressure generating means.

2. A flow control valve apparatus according to claim 1, wherein said wall surface of said main fluid passage is formed into a shape such that said opening area assumes one of a root function and a function approximate to said root function with respect to the stroke of travel of said displacement member.

3. A flow control valve apparatus according to claim 1, wherein said control means includes spring means for urging a valve member of said pilot valve and said displacement member of said differential pressure generating means toward each other.

4. A flow control valve apparatus according to claim 3, wherein said spring means is a tension spring disposed between said displacement member of said differential pressure generating means and said valve member of said pilot valve.

5. A flow control valve apparatus according to claim 3, wherein said control means further comprises a rod member integral with said displacement member of said differential pressure generating means and extending through said valve member of said pilot valve, and in that said spring means is disposed between a valve spool of said pilot valve and the end of said rod member opposite to said displacement member.

6. A flow control valve apparatus according to claim 1, wherein said control means is comprised of a pilot valve spool integral with a valve member of said pilot valve and passage means for conducting pressure upstream of said displacement member of said differential pressure generating means to one end of said pilot valve spool and for conducting pressure downstream of said displacement member to the other end of said pilot valve spool.

7. A flow control valve apparatus according to claim 6, further including a pressing rod having one end projecting into the upstream side of said displacement member of said differential pressure generating means and the other end projecting into the downstream side of said displacement member, said pressing rod being disposed for engagement with said valve member of said pilot valve.

8. A flow control valve apparatus according to claim 1, wherein said control means includes sensing means for electrically sensing displacement of said displacement member of said differential pressure generating means and controlling means for controlling the operating force of said pilot valve in response to electrical signals provided by said sensing means.

9. A flow control valve apparatus according to claim 1, wherein said displacement member of said differential pressure generating means also serves as a check valve.

10. A flow control valve apparatus according to claim 1, wherein said auxiliary passage includes a through hole which is coaxially formed in said valve member of said main valve, said pilot valve having a movable valve seat integral with said valve valve of said main valve and formed at one end of said auxiliary passage.

11. A flow control valve apparatus according to claim 1, further comprising a fixed guide of said valve member of said main valve formed on a wall portion of said housing that forms said backpressure chamber and projecting toward said valve member of said main valve, said auxiliary passage including a through hole coaxially formed in said valve member of said main valve and said main valve, and said pilot valve having a fixed valve seat integral with said housing and formed on said fixed guide at one end of said through hole thereof.

12. A flow control valve apparatus according to claim 1, wherein said main valve is a seat valve.

13. A flow control valve apparatus according to claim 1, wherein said auxiliary passage includes a through hole which is formed in said valve member of said main valve along the axis thereof, said pilot valve and said displacement member of said differential pressure generating means being coaxially disposed with said valve member of said main valve interposed between said pilot valve and said displacement member.

14. A flow control valve apparatus according to claim 13, wherein said control means includes a tension spring disposed between said displacement member of said differential pressure generating means and said valve member of said pilot valve for urging said displacement member and said valve member of said pilot valve toward each other with said valve member of said main valve interposed therebetween, said tension spring being disposed in said through hole formed in said valve member of said main valve.

15. A flow control valve apparatus according to claim 13, wherein said control means includes a rod member integral with said displacement member of said differential pressure generating means and a compression spring disposed between the end of said rod member opposite to said displacement member and a valve spool of said pilot valve, said compression spring urging said displacement member and said valve member of said pilot valve toward each other with said valve member of said main valve interposed between said displacement member and said valve member of said pilot valve, said rod member being disposed in a through hole formed in said valve member of said main valve and a through hole formed in said valve member of said pilot valve.

* * * * *